(12) United States Patent
Huang et al.

(10) Patent No.: US 11,076,385 B2
(45) Date of Patent: Jul. 27, 2021

(54) BLOCK ACKNOWLEDGEMENT AND FRAGMENTATION IN MULTI-LINK COMMUNICATION BETWEEN MULTI-LINK LOGICAL ENTITIES

(71) Applicant: Intel Corporation, Santa Clara, CA (US)

(72) Inventors: Po-Kai Huang, San Jose, CA (US); Robert J. Stacey, Portland, OR (US); Daniel F. Bravo, Hillsboro, OR (US); Laurent Cariou, Portland, OR (US); Arik Klein, Givaat Shmuel (IL); Danny Ben-Ari, Hasharon Hatichon (IL); Ofer Schreiber, Kryat Ono (IL); Shahrnaz Azizi, Cupertino, CA (US); Thomas J. Kenney, Portland, OR (US); Alexander W. Min, Portland, OR (US); Yaron Alpert, Hod Hasharoni (IL); Avi Mansour, Haifa (IL); Dave A. Cavalcanti, Portland, OR (US); Jing Zhu, Portland, OR (US); Ziv Avital, Raanana (IL); Xiaogang Chen, Hillsboro, OR (US); Juan Fang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 16/537,028

(22) Filed: Aug. 9, 2019

(65) Prior Publication Data
US 2020/0037288 A1 Jan. 30, 2020

Related U.S. Application Data

(60) Provisional application No. 62/717,129, filed on Aug. 10, 2018, provisional application No. 62/728,274, (Continued)

(51) Int. Cl.
*H04W 72/00* (2009.01)
*H04L 5/00* (2006.01)
*H04L 29/12* (2006.01)

(52) U.S. Cl.
CPC ......... *H04W 72/005* (2013.01); *H04L 5/0055* (2013.01); *H04L 61/2069* (2013.01); *H04L 61/6022* (2013.01)

(58) Field of Classification Search
CPC ... H04L 1/1614; H04L 1/1685; H04L 1/1835; H04L 1/188; H04L 5/0055;
(Continued)

(56) References Cited

U.S. PATENT DOCUMENTS

| 7,487,424 B2 * | 2/2009 | Nam | H04L 1/1621 |
| | | | 714/748 |
| 7,826,436 B2 * | 11/2010 | Niu | H04L 1/1867 |
| | | | 370/342 |
| 2019/0036651 A1 * | 1/2019 | Chitrakar | H04L 1/1621 |

* cited by examiner

*Primary Examiner* — Phuc H Tran
(74) *Attorney, Agent, or Firm* — Schwegman Lundberg & Woessner, P.A.

(57) ABSTRACT

Embodiments of a station (STA) and method of communication are generally described herein. The STA may be included in a first plurality of STAs affiliated with a first multi-link logical entity (MLLE). A plurality of links may be established between the first MLLE and a second MLLE, wherein the second MLLE may be affiliated with a second plurality of STAs. The STA may receive a first subset of a sequence of MAC protocol data units (MPDUs). A second subset of the sequence of MPDUs may be transmitted by another STA of the first plurality of STAs. The STA may transmit a block acknowledgement (BA) frame that includes: a number of BA bitmaps, configurable to values greater than or equal to one; and BA control information for each of the BA bitmaps.

21 Claims, 21 Drawing Sheets

Related U.S. Application Data filed on Sep. 7, 2018, provisional application No. 62/756,727, filed on Nov. 7, 2018.

(58) Field of Classification Search
CPC ............ H04L 61/2069; H04L 61/6022; H04L 1/0036; H04L 1/0057; H04L 1/0072; H04L 1/12; H04L 1/165; H04L 1/1664; H04L 1/1822; H04L 1/1829; H04L 1/1832; H04L 1/1841; H04L 1/1848; H04L 1/1858; H04L 1/1867; H04L 1/187; H04L 25/0202; H04L 25/0204; H04L 27/0008; H04L 41/0896; H04L 43/0847; H04L 43/0888; H04L 43/0894; H04L 47/22; H04L 47/2483; H04L 47/30; H04L 49/9057; H04L 5/001; H04L 5/0026; H04L 5/0046; H04L 5/0048; H04L 5/0057; H04L 5/0064; H04L 5/0082; H04L 5/0092; H04L 63/0428; H04L 69/14; H04W 72/005

See application file for complete search history.

1600

Figure 9-36—BA Information field (Multi-TID BlockAck)

1620

Figure 9-38a—BA Information field format (Multi-STA BlockAck)

Figure 9-38b—Per AID TID Info subfield format if the AID11 subfield is not 2045

1640

Figure 9-29—BAR Information field (Multi-TID BlockAckReq)

FIG. 18A

| | | | | |
|---|---|---|---|---|
| PRIMARY CHANNEL | L-STF, L-LTF, L-SIG | HE-SIGA, HE-STF, HE-LTF, HESIGB | DATA | PAD | HE M-STA BA |
| | L-STF, L-LTF, L-SIG | HE-SIGA, HE-STF, HE-LTF, HESIGB | | | |
| | L-STF, L-LTF, L-SIG | HE-SIGA, HE-STF, HE-LTF, HESIGB | | | |
| | L-STF, L-LTF, L-SIG | HE-SIGA, HE-STF, HE-LTF, HESIGB | | | |
| TEMPORARY PRIMARY CHANNEL | L-STF, L-LTF, L-SIG | NBT-SIGA, NBT-STF, NBT-LTF, NBTSIGB | DATA | PAD | NBT M-STA BA |
| | L-STF, L-LTF, L-SIG | NBT-SIGA, NBT-STF, NBT-LTF, NBTSIGB | | | |
| | L-STF, L-LTF, L-SIG | NBT-SIGA, NBT-STF, NBT-LTF, NBTSIGB | | | |
| | L-STF, L-LTF, L-SIG | NBT-SIGA, NBT-STF, NBT-LTF, NBTSIGB | | | |

1800

FIG. 18B (1830) — same structure as FIG. 18A, with the Temporary Primary Channel DATA field shorter than the Primary Channel DATA field.

| L-STF | L-SIG | RL-SIG | HE-SIGA | HE-SIGB | SIGB PADD | HE-STF | HE-LTF | HE-LTF | HE-LTF | DATA | DATA | DATA | DATA | DATA | ... | PE |

2200

| L-STF | L-SIG | RL-SIG | XT-SIGA | XTSIGB | XT-STF | XT-LTF | XT-LTF | XT-LTF | XT-LTF | DATA | DATA | DATA | ... | PE |

FIG. 22

BLOCK ACKNOWLEDGEMENT AND FRAGMENTATION IN MULTI-LINK COMMUNICATION BETWEEN MULTI-LINK LOGICAL ENTITIES

PRIORITY CLAIM

This application claims priority under 35 USC 119(e) to U.S. Provisional Patent Application Ser. No. 62/717,129, filed Aug. 10, 2018 [reference number AB1062-Z, 1884.876PRV], and to U.S. Provisional Patent Application Ser. No. 62/728,274, filed Sep. 7, 2018 [reference number 1884.878PRV], and to U.S. Provisional Patent Application Ser. No. 62/756,727, filed Nov. 7, 2018 [reference number 1884.879PRV], all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for block acknowledgement and fragmentation in multi-link communication between multi-link logical entities.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIGS. 18A, 18B and 18C illustrate example arrangements of channels in accordance with some embodiments;

FIG. 22 illustrates example arrangements of channels in accordance with some embodiments.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
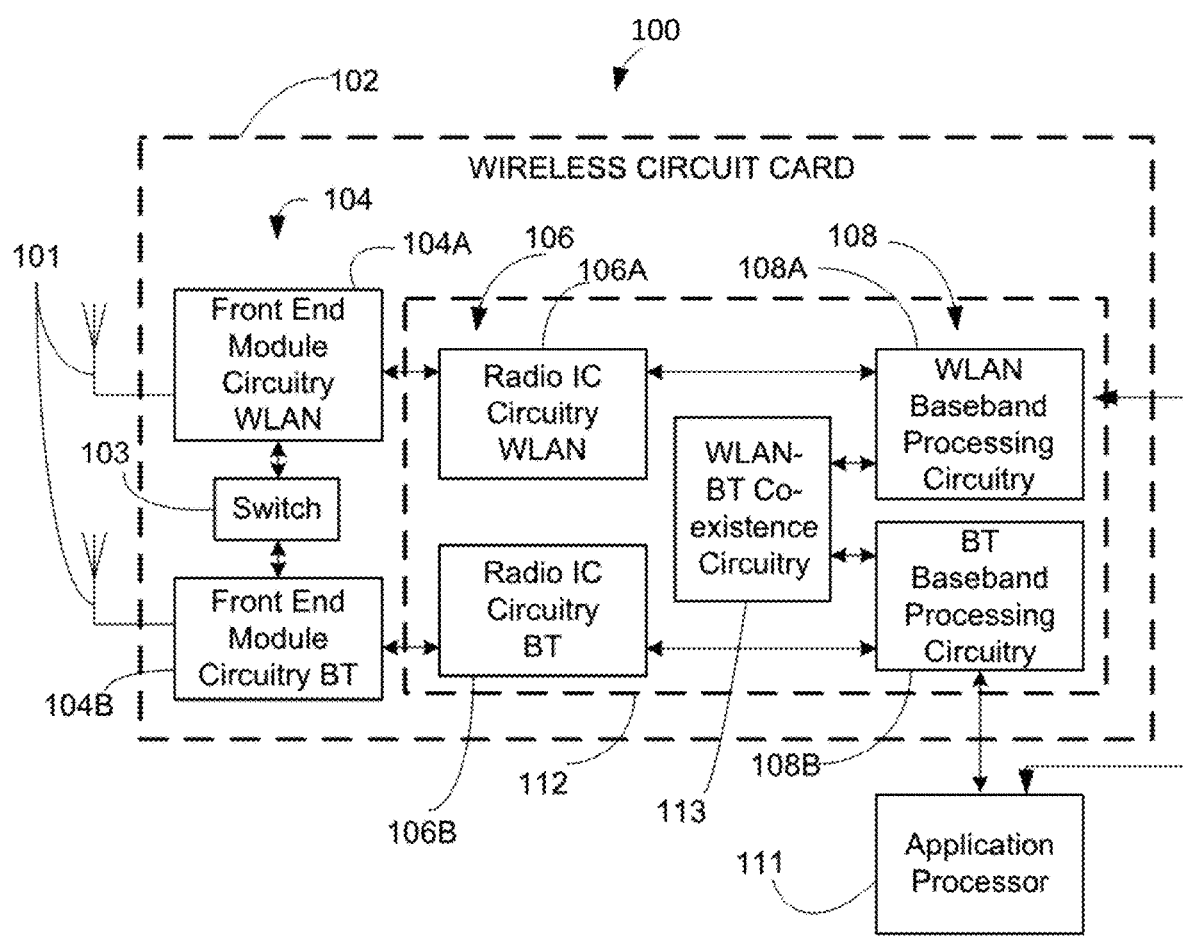
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
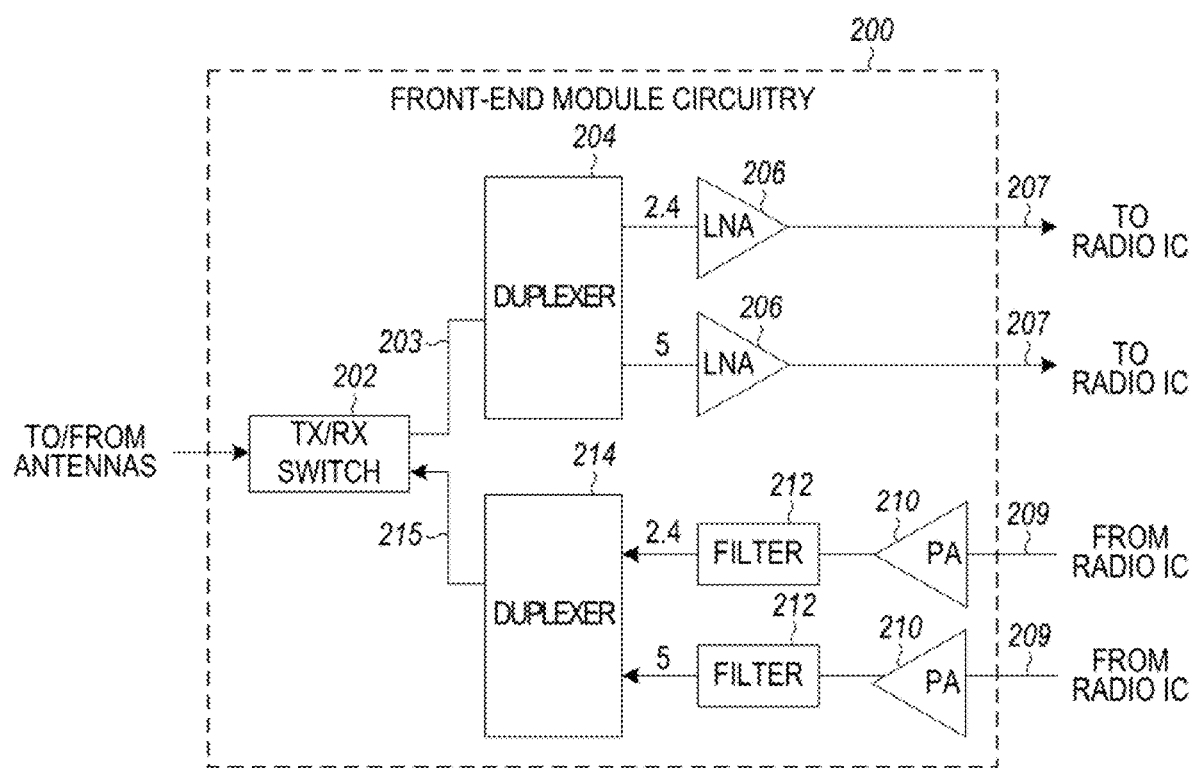
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
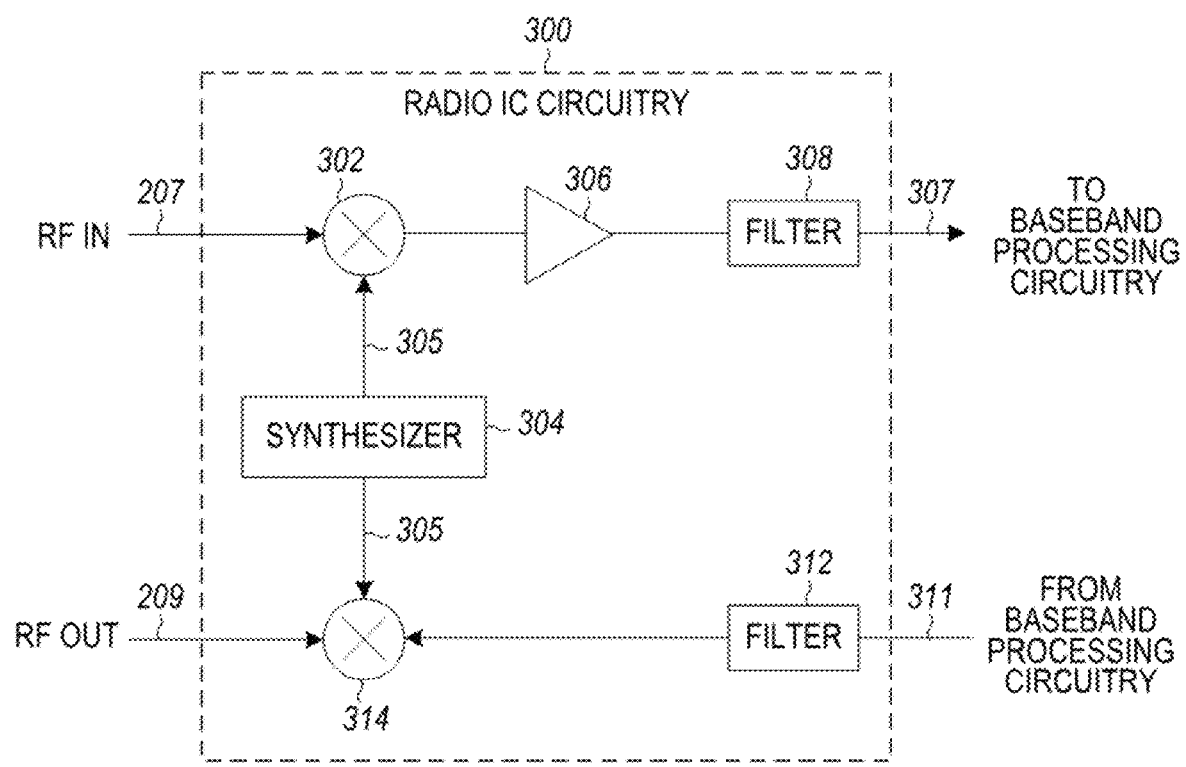
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
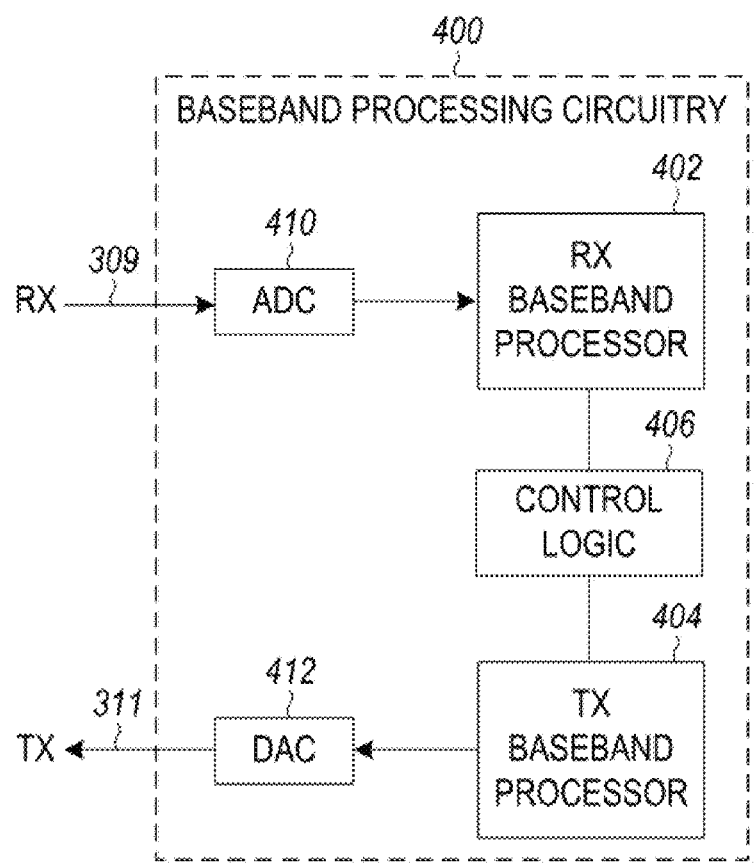
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
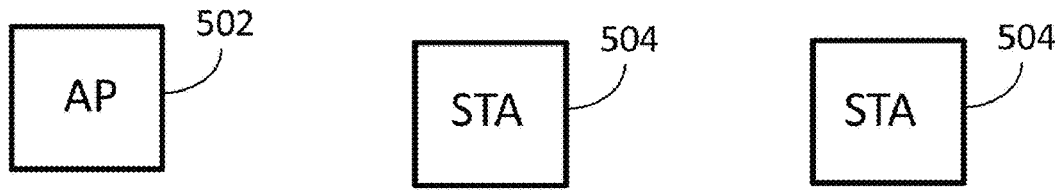
FIG. 5 illustrates a WLAN in accordance with some embodiments.
Figure 5:
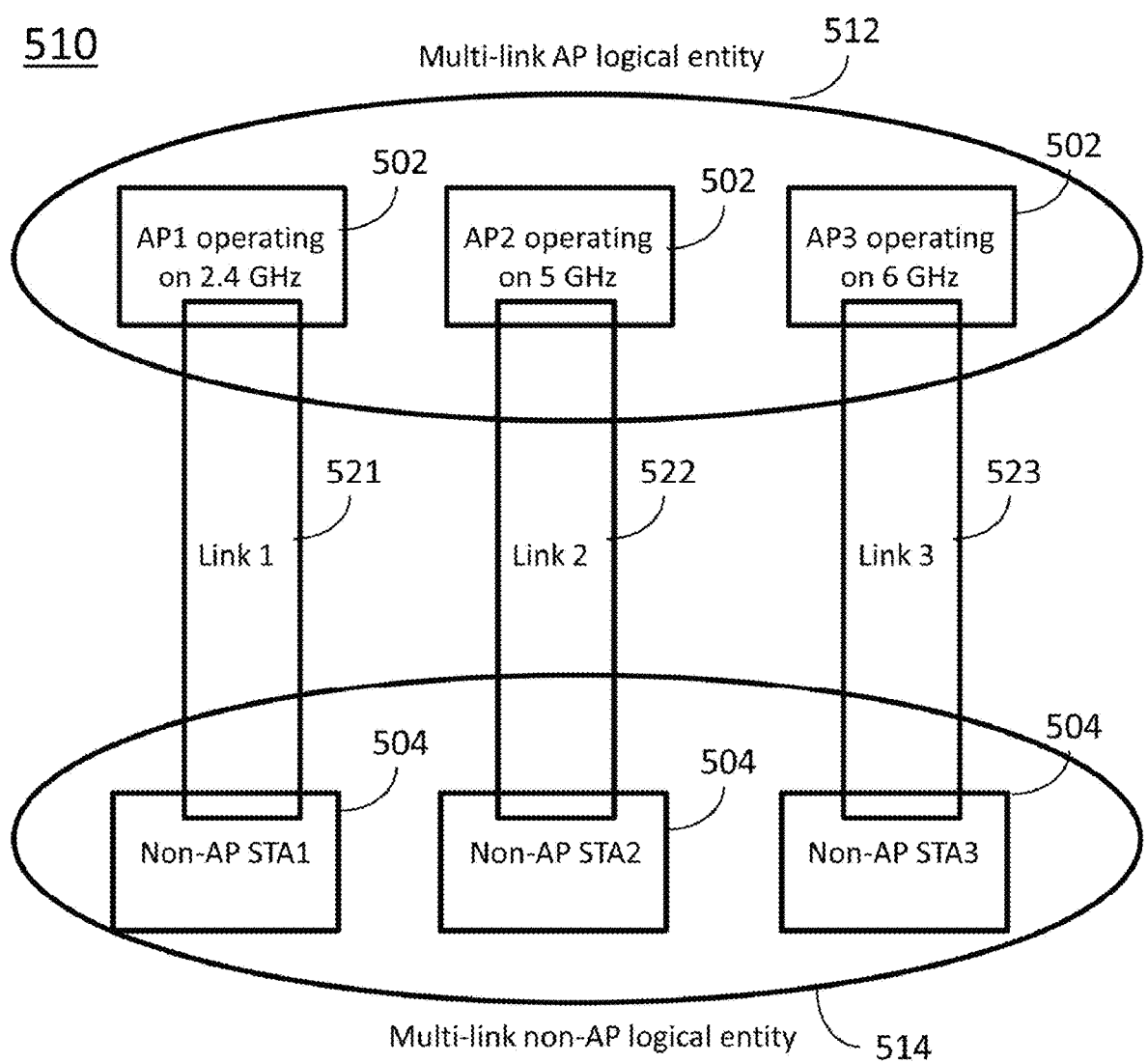

FIG. 5 illustrates a WLAN 500 in accordance with some embodiments. In some embodiments, the WLAN 500 may comprise an AP 502, and one or more stations (STAs) 504. In some embodiments, the AP 502 may communicate with one or more of the STAs 504. Embodiments are not limited to a single AP 502, as the WLAN 500 may comprise one or more APs 502, in some embodiments.

In some embodiments, as shown in 510, multiple APs 502 may be included in a multi-link AP logical entity 512. In addition, multiple STAs 504 may be included in a multi-link non-AP logical entity 514.

In some embodiments, a "multi-link logical entity" is a logical entity that has one or more affiliated STAs. The logical entity has one MAC data service interface and primitives to the LLC and a single address associated with the interface, which can be used to communicate on the DSM. A "multi-link AP logical entity" is a multi-link logical entity, wherein each STA within the multi-link logical entity is an AP. A multi-link non-AP logical entity is a multi-link logical entity, wherein each STA within the multi-link logical entity is a non-AP STA. In some embodiments, a multi-link logical entity allows STAs (AP or non-AP STA) within the multi-link logical entity to have the same MAC address.

It should be noted that some descriptions herein refer to performance of one or more techniques, operations and/or methods by components of multi-link logical entities, wherein each multi-link logical entity is affiliated with a plurality of STAs. It is understood that the STAs may be STAs and/or non-AP STAs, in some embodiments. It is also understood that one or more of those multi-link logical entities may be multi-link AP logical entities, in some embodiments. It is also understood that one or more of those multi-link logical entities may be multi-link non-AP logical entities, in some embodiments.

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.11ax, EHT-related, and/or other. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502.

The AP 502 and/or the STAs 504 may operate in accordance with one or more of IEEE 802.11 a/b/g/n/ac/ad/af/ah/aj/ay, EHT, or another wireless communication standard. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol and/or EHT protocol.

The AP 502 may communicate with the STAs 504 in accordance with IEEE 802.11 communication techniques.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the P 502, STA 504, and/or other device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the STA 504 and/or the AP 502 are configured to perform the methods and operations/functions described herein in conjunction with one or more of the figures described herein. In example embodiments, an apparatus of the STA 504 and/or an apparatus of the AP 502 are configured to perform the methods and functions described herein in conjunction with one or more of the figures described herein. The term Wi-Fi may refer to one or more of the IEEE 802.11 communication standards.

Figure 6:
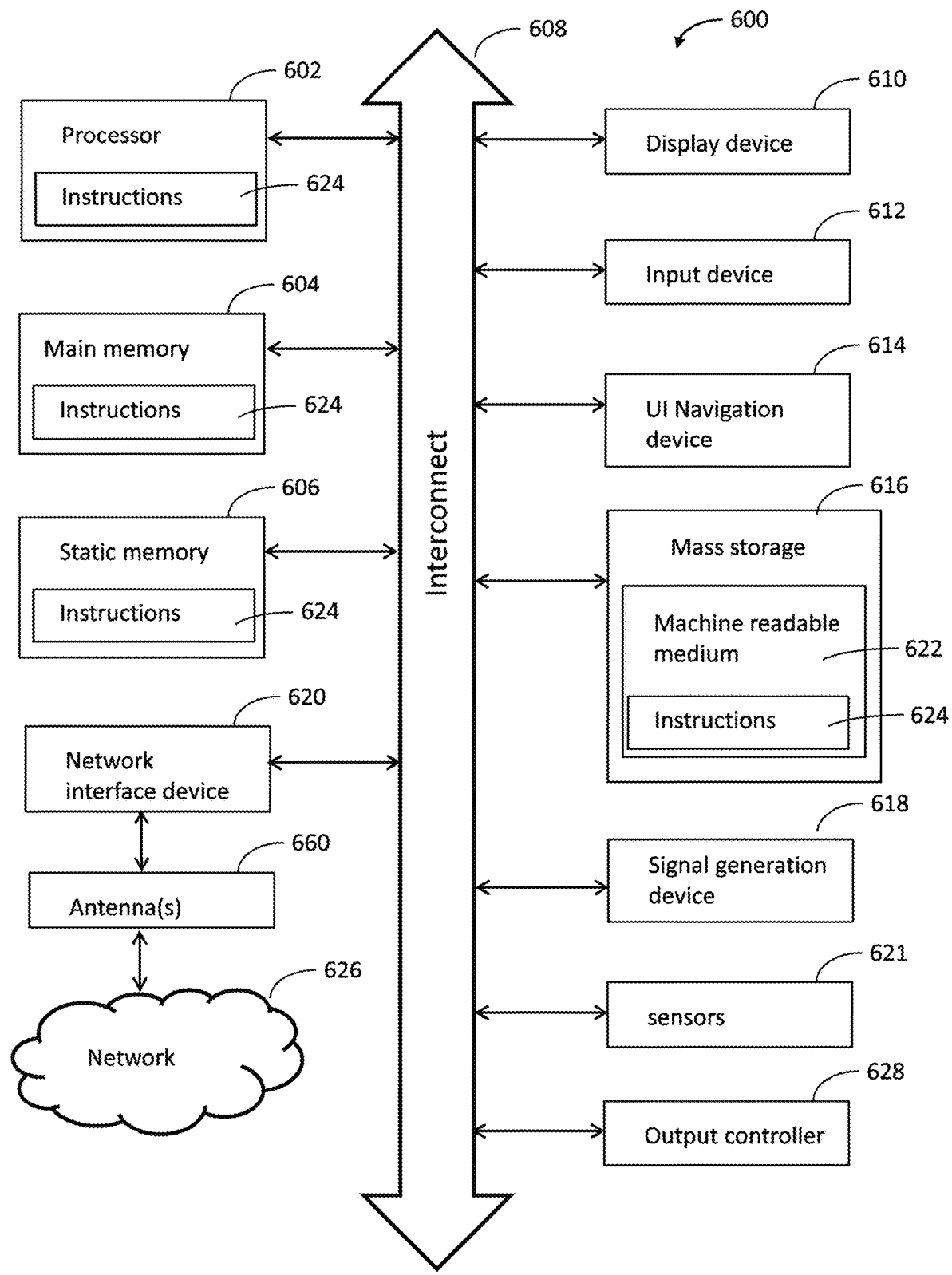
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
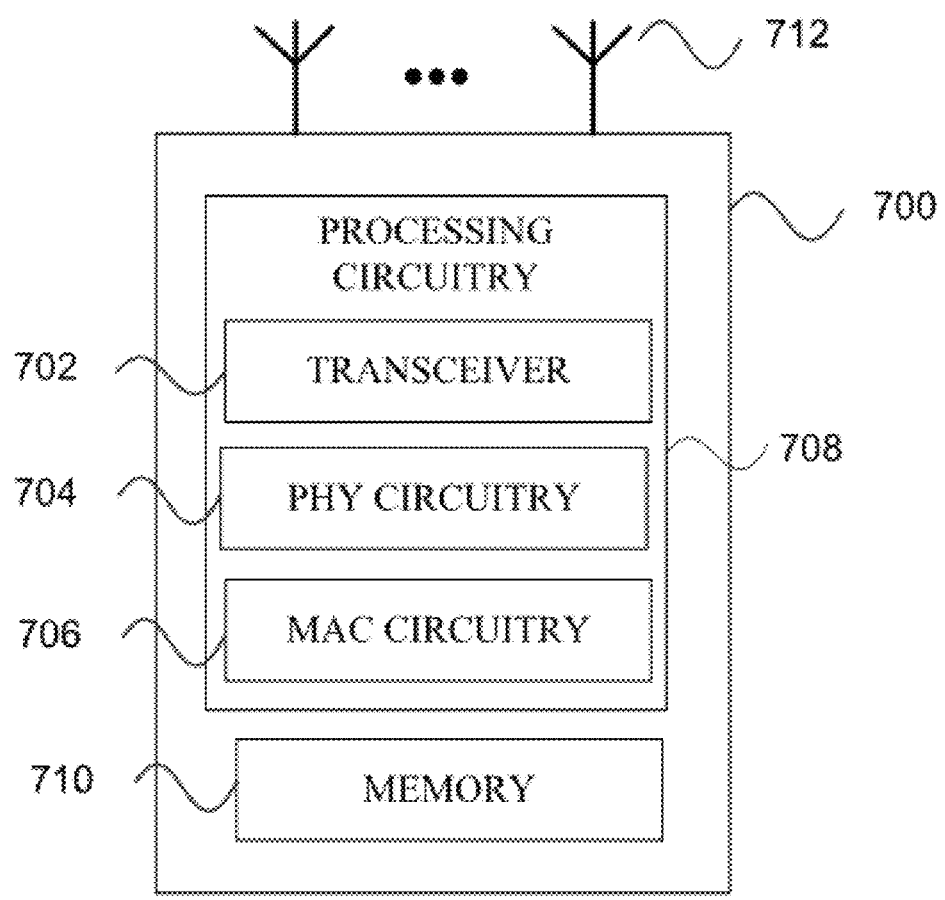
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, a STA 504 may be included in a first plurality of STAs 504 affiliated with a first multi-link logical entity (MLLE). As part of the first MLLE, the STAs 504 of the first plurality of STAs 504 may share a common medium access control (MAC) data service interface to an upper layer. The common MAC data service interface may be associated with a common MAC address. A plurality of links may be established between the first MLLE and a second MLLE, wherein the second MLLE may be affiliated with a second plurality of STAs 504. A link may be established between each STA 504 of the first plurality of STAs 504 and one of the STAs 504 of the second plurality of STAs 504. The STA 504 may receive a first subset of a sequence of MAC protocol data units (MPDUs). The MPDUs of the sequence may be associated with a traffic identifier (TID) and may be indexed by sequence numbers (SNs). The MPDUs of the first subset may be received on the link between the STA 504 and the corresponding STA 504 of the second plurality of STAs 504, wherein a second subset of the sequence of MPDUs is to be transmitted by another STA 504 of the first plurality of STAs 504 to one of the STAs 504 of the second plurality of STAs 504. The STA 504 may transmit, to the corresponding STA 504 of the second plurality of STAs, a block acknowledgement (BA) frame that includes: a number of BA bitmaps, configurable to values greater than or equal to one; and for each of the BA bitmaps: BA control information. The BA control information may indicate a number of bits of the BA bitmap, and may further indicate a starting SN for the MPDUs corresponding to the bits of the BA bitmap. These embodiments are described in more detail below.

Figure 8:
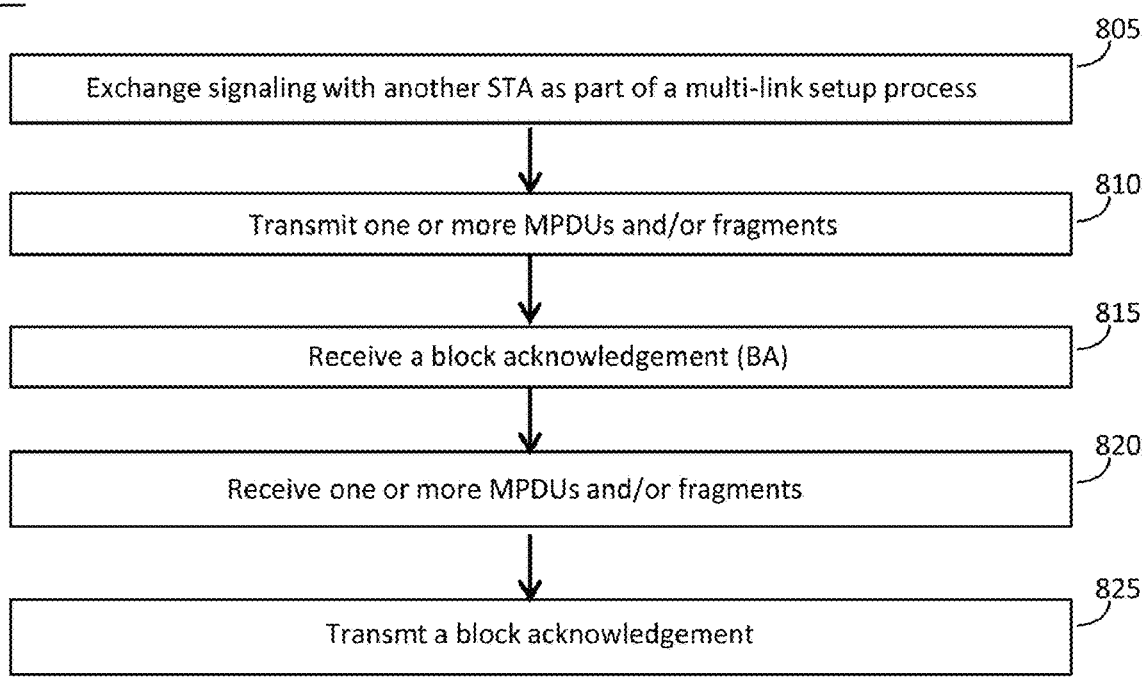
FIG. 8 illustrates the operation of a method in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In descriptions of the method 800, reference may be made to one or more figures, although it is understood that the method 800 may be practiced with any other suitable systems, interfaces and components.

In some embodiments, an STA 504 may perform one or more operations of the method 800, but embodiments are not limited to performance of the method 800 and/or operations of it by the STA 504. In some embodiments, another device and/or component may perform one or more operations that may be the same as, similar to and/or reciprocal to one or more operations of the method 800. In a non-limiting example, the AP 502 may perform an operation that may be the same as, similar to, reciprocal to and/or related to an operation of the method 800, in some embodiments. In some embodiments, the STA 504 may perform one or more of the operations of the method 800

It should be noted that one or more operations of the method 800 may be the same as, similar to and/or reciprocal to one or more operations of another method described herein. For instance, an operation of the method 800 may be the same as, similar to and/or reciprocal to another operation described herein, in some embodiments. In a non-limiting example, an operation of the method 800 may include transmission of an element (such as a frame, block, message and/or other) by the STA 504, and an operation of another method may include reception of a same element (and/or similar element) by the AP 502. In some cases, descriptions of operations and techniques described as part of one method described herein (such as 800 and/or other) may be relevant to another method described herein. Discussion of various techniques and concepts described as part of one method described herein (such as 800 and/or other) may be relevant to another method described herein, although the scope of embodiments is not limited in this respect.

The method 800 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 and/or other method described herein may also be applicable to an apparatus of an AP 502, an apparatus of a STA 504 and/or an apparatus of another device. In some embodiments, an apparatus of an AP 502 may perform one or more operations of the method 800 and/or other operations. In some embodiments, an apparatus of a STA 504 may perform one or more operations of the method 800 and/or other operations.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the STA 504 may exchange signaling with another STA 504 as part of a multi-link setup process. At operation 810, the STA 504 may transmit one or more MPDUs and/or fragments. At operation 815, the STA 504 may receive a block acknowledgement (BA) frame. At operation 820, the STA 504 may receive one or more MPDUs and/or fragments. At operation 825, the STA 504 may transmit a block acknowledgement (BA) frame.

In some embodiments, the STA 504 may be included in a first plurality of STAs 504. The STAs 504 may be affiliated with a first multi-link logical entity (MLLE). As part of the first MLLE, the STAs 504 of the first plurality of STAs 504 may share a common medium access control (MAC) data service interface to an upper layer, wherein the common MAC data service interface is associated with a common MAC address. A plurality of links may be established between the first MLLE and a second MLLE. The second MLLE may be affiliated with a second plurality of STAs 504. A link may be established between each STA 504 of the first plurality of STAs 504 and one of the STAs 504 of the second plurality of STAs 504.

In some embodiments, the STA 504 may receive a first subset of a sequence of MAC protocol data units (MPDUs). The MPDUs of the sequence may be associated with a traffic identifier (TID). The MPDUs of the sequence may be indexed by sequence numbers (SNs). The MPDUs of the first subset may be received on the link between the STA 504 and the corresponding STA 504 of the second plurality of STAs 504. A second subset of the sequence of MPDUs may be transmitted by another STA 504 of the first plurality of STAs 504 to one of the STAs 504 of the second plurality of STAs 504. The STA 504 may transmit, to the corresponding STA 504 of the second plurality of STAs 504, a block acknowledgement (BA) frame that includes one or more of: A) a number of BA bitmaps, configurable to values greater than or equal to one; B) for each of the BA bitmaps, BA control information, wherein the BA control information may indicate a number of bits of the BA bitmap, a starting SN for the MPDUs corresponding to the bits of the BA bitmap, and/or C) other.

In some embodiments, the STA 504 may encode the BA frame to include a BA variant that includes the BA bitmaps. In some embodiments, the BA variant may be a Multi-STA BA variant or a Multi-TID (traffic identifier) BA variant.

In some embodiments, the STA 504 may transmit, to the corresponding STA 504 of the second plurality of STAs 504, a legacy BA request (BAR) variant. The legacy BAR variant may solicit usage of multiple BA bitmaps. In some embodiments, the legacy BAR variant may be a Multi-STA BAR variant or a Multi-TID BAR variant. One or more bits of the legacy BAR variant may be re-purposed for the STA to solicit usage of multiple BA bitmaps In some embodiments, the STA 504 may transmit, to the corresponding STA 504 of the second plurality of STAs 504, a BAR variant (including but not limited to a new BAR variant, a non-legacy BAR variant and/or other). The BAR variant may solicit usage of multiple BA bitmaps. One or more bits of the BAR variant may be allocated for the STA to solicit usage of multiple BA bitmaps.

In some embodiments, the STA 504 may encode the legacy BAR variant or the BAR variant to solicit usage of one or more BA bitmap sizes. In some embodiments, the number of bits in each of the BA bitmaps may be a multiple of 8. Non-limiting examples include 512 and 1024. The sequence of MPDUs may be configurable to include more than 256 MPDUs. One or more bits of the BA variant may be re-purposed to indicate the number of bits of one or more of the BA bitmaps and/or other information.

In some embodiments, the STA 504 may transmit a legacy BA variant to indicate the number of bits of one or more of the BA bitmaps. In some embodiments, the legacy BA variant may be one or more of: a Compressed BA variant, a Multi-STA BA variant, and/or other. In some embodiments, the STA 504 may encode a BA variant (including but not limited to a new BA variant, a non-legacy BA variant and/or other) to indicate the number of bits of one or more of the BA bitmaps. One or more bits of the BA variant may be allocated to indicate the number of bits of one or more of the BA bitmaps.

In some embodiments, the STA 504 may exchange signaling with the corresponding STA 504 of the second plurality of STAs 504 as part of a multi-link setup process between the first MLLE and the second MLLE. The multi-link setup process may establish the links between the STAs 504 of the first plurality of STAs 504 and the corresponding STAs 504 of the second plurality of STAs 504. As part of the multi-link setup process, the STA 504 may receive, from the corresponding STA 504 of the second plurality of STAs 504, a multi-link setup Request Frame that includes capability information of the corresponding STA 504 of the second plurality of STAs 504 and capability information of the other STAs 504 of the second plurality of STAs 504 or MAC addresses of the other STAs 504 of the second plurality of STAs 504. The STA 504 may transmit, to the corresponding STA 504 of the second plurality of STAs 504, a multi-link setup Response Frame that includes capability information of the STA 504 and capability information of the other STAs

504 of the first plurality of STAs 504 or MAC addresses of the other STAs 504 of the first plurality of STAs 504.

In some embodiments, the multi-link setup process may enable the first MLLE to serve as an interface between a distribution system (DS) and the second MLLE.

In some embodiments, the STA 504 may be configured to operate in a frequency band that is different from a frequency band of at least one of the other STAs of the first plurality of STAs 504. In some embodiments, the STA 504 may be co-located with at least one of the other STAs of the first plurality of STAs 504. In some embodiments, the STA 504 may be non-co-located with at least one of the other STAs 504 of the first plurality of STAs 504. In some embodiments, the processing circuitry of the STA 504 may be configured to perform operations for the STA 504 and for at least one other STA 504 of the first plurality of STAs 504.

In some embodiments, the STA 504 may transmit, to a corresponding STA 504 of the second plurality of STAs 504, an aggregated MAC protocol data unit (A-MPDU) that includes: multiple MAC protocol data units (MPDUs); for each of the MPDUs included in the A-MPDU, a block acknowledgement (BA) index for a BA bitmap; and/or other. The BA index may indicate a bit position within the BA bitmap to be used, by the corresponding STA 504 of the second plurality of STAs 504, to acknowledge the MPDU. The multiple MPDUs of the A-MPDU may be a subset of a sequence of MPDUs. The sequence of MPDUs may be transmitted by the first plurality of STAs 504 to the second plurality of STAs 504 in accordance with the first and second MLLEs. The sequence of MPDUs may be divided into multiple subsets, each subset to be transmitted by a different STA 504 of the first plurality of STAs 504.

In some embodiments, the STA 504 may assign the BA indexes to the MPDUs of the A-MPDU. The assignment of the BA indexes to the MPDUs may be configurable to be independent of the corresponding SNs of the MPDUs.

In some embodiments, the STA 504 may encode the A-MPDU to include, for each of the MPDUs included in the A-MPDU, a delimiter that includes the BA index of the MPDU.

In some embodiments, the STA 504 may receive the BA bitmap from the corresponding STA 504 of the second plurality of STAs 504. In some embodiments, the STA 504 may determine whether each of the transmitted MPDUs was successfully received by the STA 504 based on values of the BA bitmap in bit positions corresponding to the indexes indicated in the A-MPDU.

In some embodiments, the BA bitmap may be included in a legacy BA variant. One or more bits of the legacy BA variant may be re-purposed to include one or more bits of the BA bitmap. In some embodiments, the BA bitmap may be included in a BA variant. A plurality of bits of the BA variant may be allocated for the BA bitmap.

In some embodiments, the STA 504 may encode the A-MPDU to indicate a maximum number of BA indexes that can be supported by the BA bitmap.

In some embodiments, the STA 504 may, for a plurality of fragments of a MAC protocol data unit (MPDU), encode one or more of the fragments for transmission on the link between the STA 504 and the corresponding STA 504 of the second plurality of STAs 504. The STA 504 may attempt to decode acknowledgement (ACK) indicators for the transmitted fragments. If the STA 504 determines, based on received ACK indicators, successful reception of at least one of the transmitted fragments: all of the fragments of the MPDU are to be transmitted exclusively by the STA 504 without transmission of any of the fragments by any of the other STAs 504 of the first plurality of STAs 504.

In some embodiments, if the STA 504 determines, based on received ACK indicators, successful reception of at least one of the transmitted fragments, all of the fragments of the frame may be transmitted exclusively by the STA 504 without transmission of any of the fragments by any of the other STAs 504 of the first plurality of STAs 504 unless the processing circuitry determines that the first MLLE is to perform a flush operation for the MPDU. As part of the flush operation, the entire MPDU may be transmitted by another STA 504 of the first plurality of STAs 504 on another link, including fragments for which the STA 504 has previously determined successful reception on the link between the STA 504 and the corresponding STA 504 of the second plurality of STAs 504.

In some embodiments, if the STA 504 decodes at least one ACK indicator that indicates successful reception of one of the fragments, and if a switch to another link is to occur before the processing circuitry determines successful reception of all the fragments: the STA 504 may refrain from switching to the other link until the processing circuitry determines successful reception of all of the fragments.

In some embodiments, the STA 504 may transmit, to one or more of the other STAs 504 of the first plurality of STAs 504, signaling that indicates parameters that are related to fragmentation, and that are to be used on all of the links of the plurality of links. The parameters may include one or more of: a dot11EDCATableMSDULifetime and timer, a dot11MaxTransmitLifetime and timer, a dot11MaxReceiveLifetime and timer, and/or other.

In some embodiments, the STA 504 may transmit, to one or more of the STAs 504 of the first plurality of STAs 504, signaling that indicates parameters related to fragmentation, and that are configurable for different values for different links. The parameters may be related to one or more of: support of a fragmentation level, a minimum fragment size, a capability of aggregated MAC service data unit (A-MSDU) fragmentation, a number of outstanding fragmented MPDUs or A-MSDUs permitted, a dot11FragmentationThreshold parameter, and/or other.

In some embodiments, an apparatus of a STA 504 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

Figure 9:
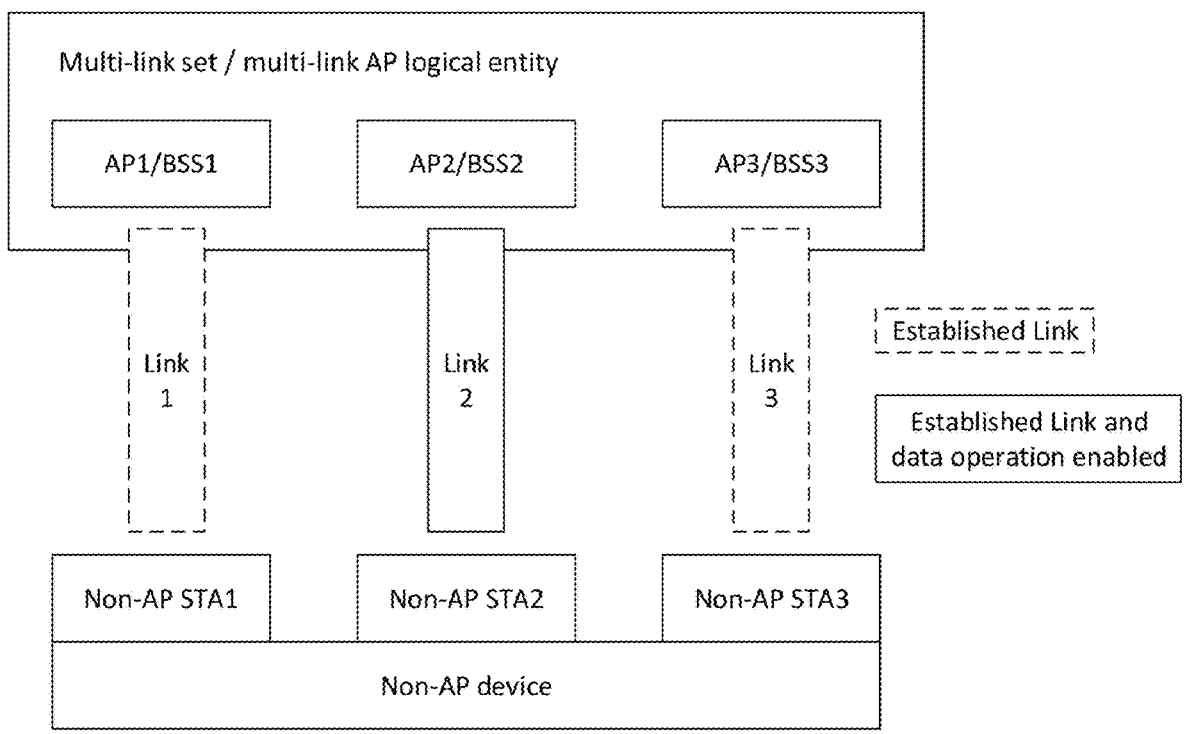
FIG. 9 illustrates an example of a multi-link arrangement in accordance with some embodiments.
Figure 10:
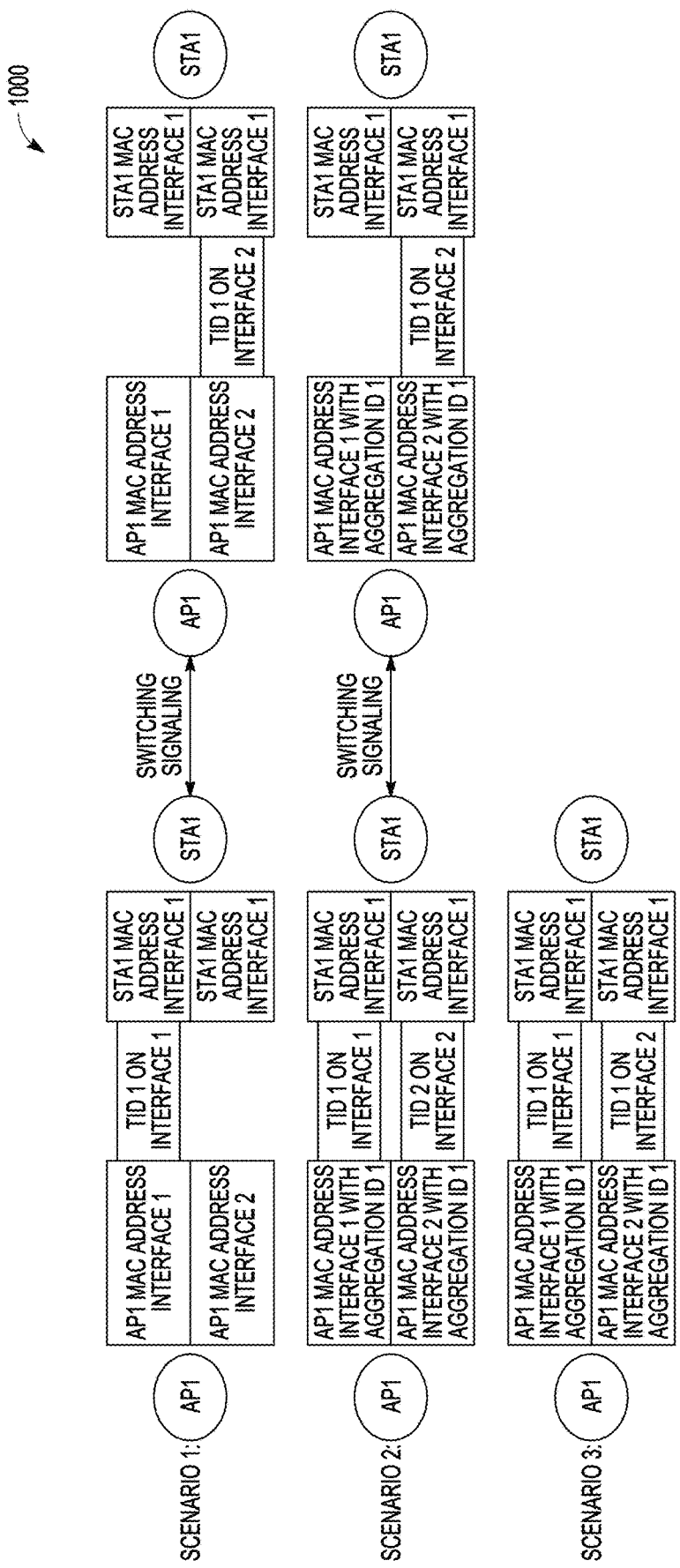
FIG. 10 illustrates example multi-link arrangements in accordance with some embodiments.
Figure 11:
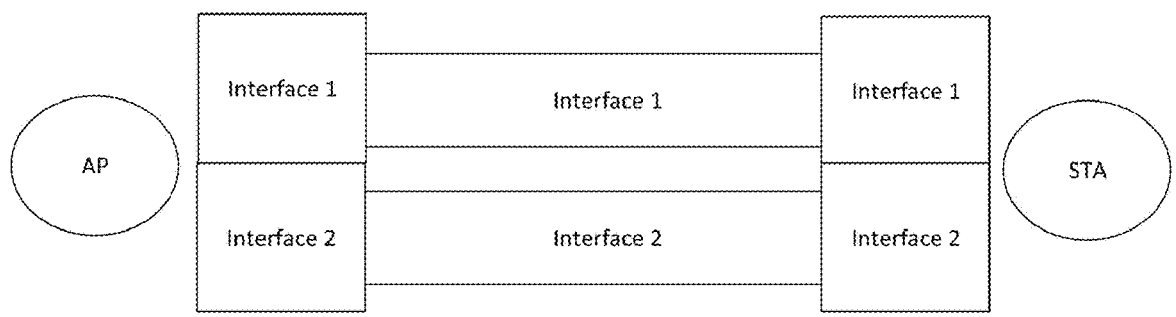
FIG. 11 illustrates an example of a multi-link arrangement in accordance with some embodiments.
Figure 12:
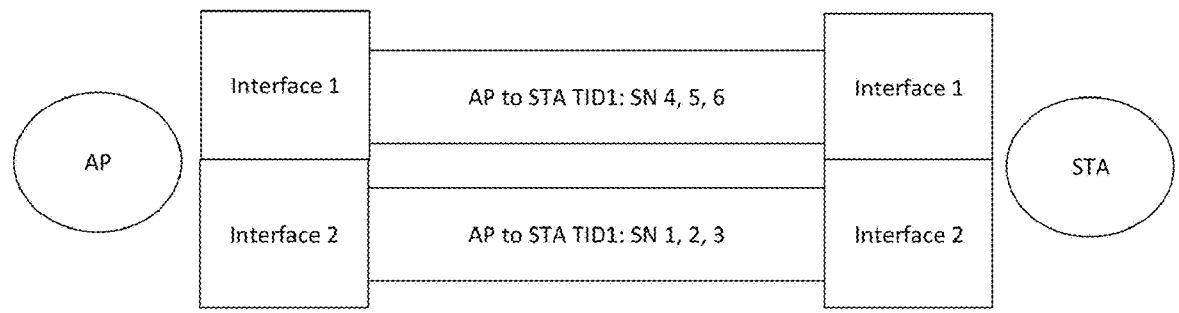
FIG. 12 illustrates an example of a multi-link arrangement in accordance with some embodiments.
Figure 13:
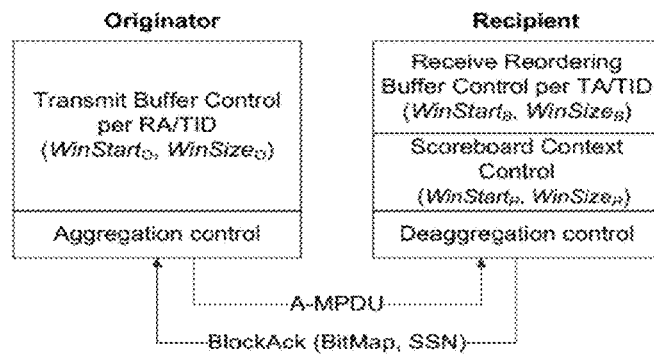
FIG. 13 illustrates an example related to block acknowledgement (BA) in accordance with some embodiments.
Figure 14:
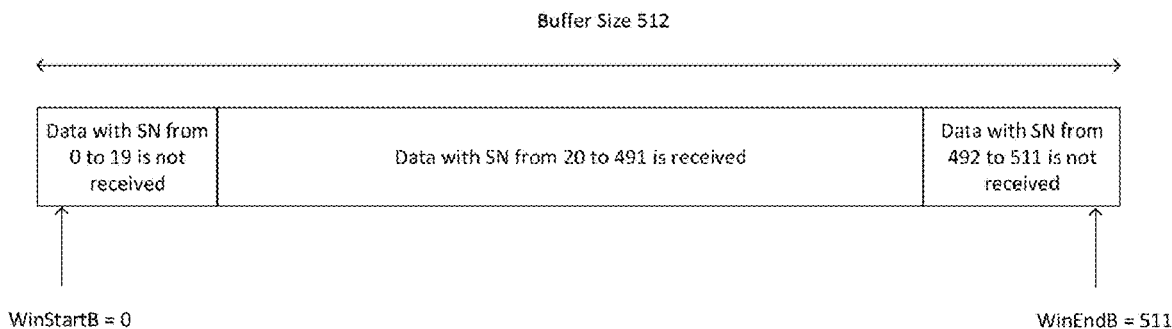
FIG. 14 illustrates an example related to BA in accordance with some embodiments.
Figure 15:
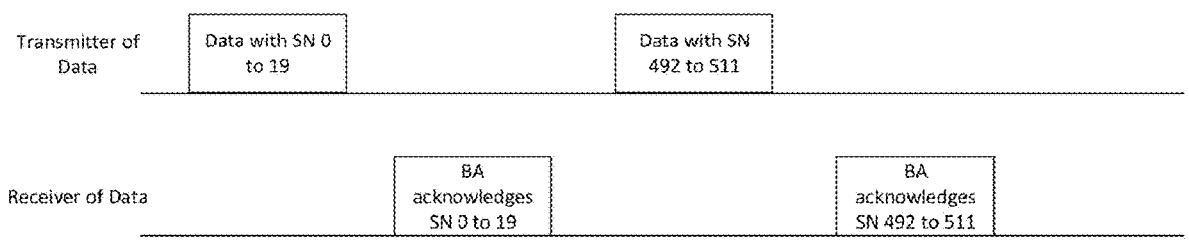
FIG. 15 illustrates an example related to BA in accordance with some embodiments.
Figure 16:
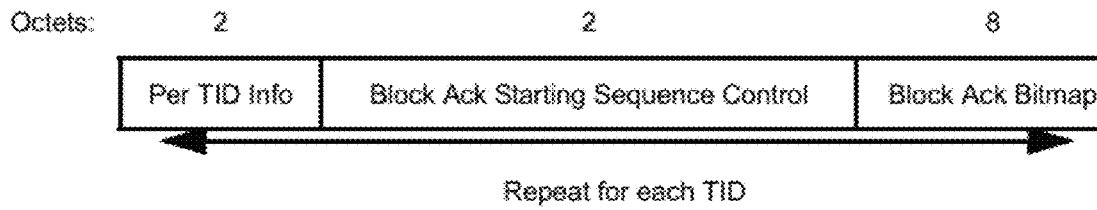
FIG. 16 illustrates example fields in accordance with some embodiments.
Figure 16:
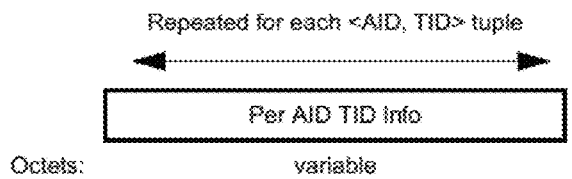
Figure 16:
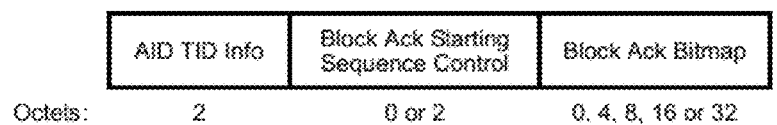
Figure 16:
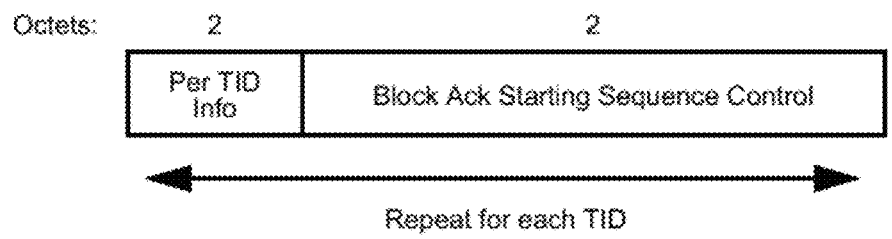

FIG. 9 illustrates an example of a multi-link arrangement in accordance with some embodiments. FIG. 10 illustrates example multi-link arrangements in accordance with some embodiments. FIG. 11 illustrates an example of a multi-link arrangement in accordance with some embodiments. FIG. 12 illustrates an example of a multi-link arrangement in accordance with some embodiments. FIG. 13 illustrates an example related to block acknowledgement (BA) in accordance with some embodiments. FIG. 14 illustrates an example related to BA in accordance with some embodiments. FIG. 15 illustrates an example related to BA in accordance with some embodiments. FIG. 16 illustrates example fields in accordance with some embodiments. FIG.

Figure 18C:
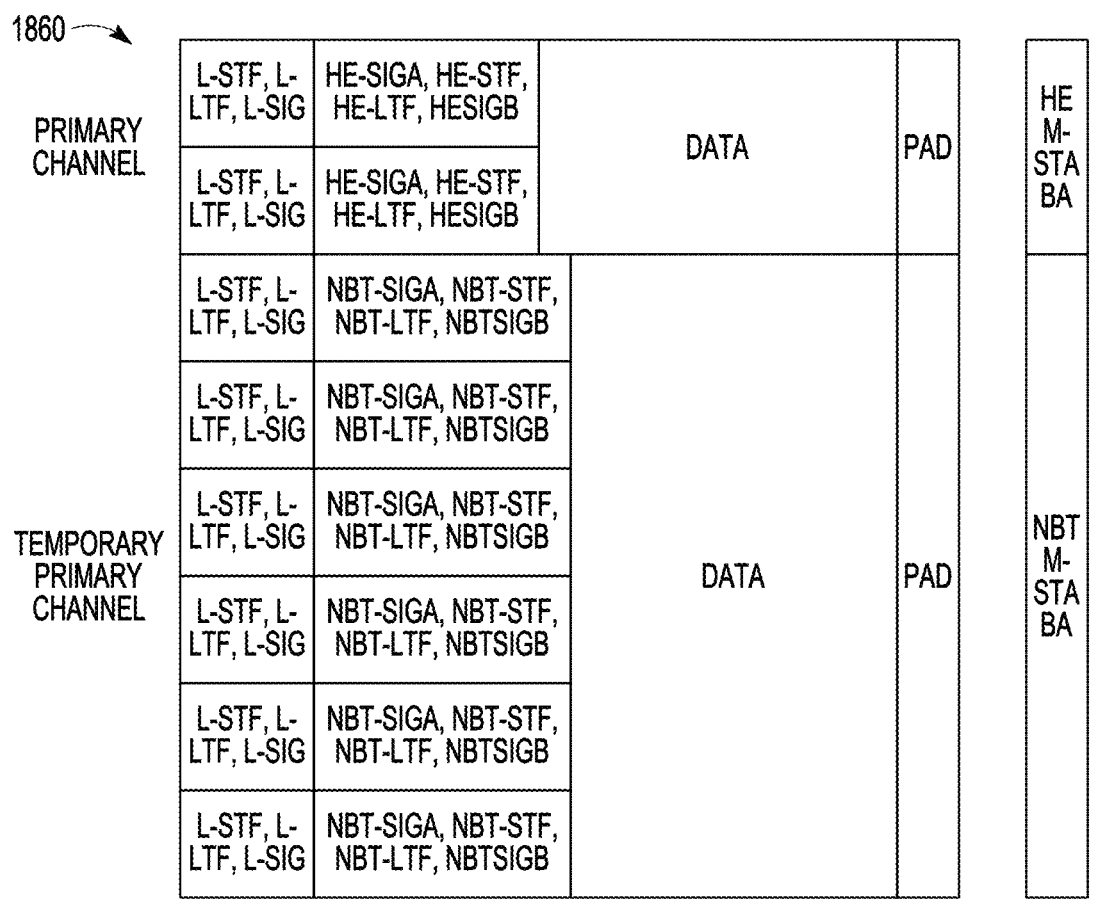
Figure 19:
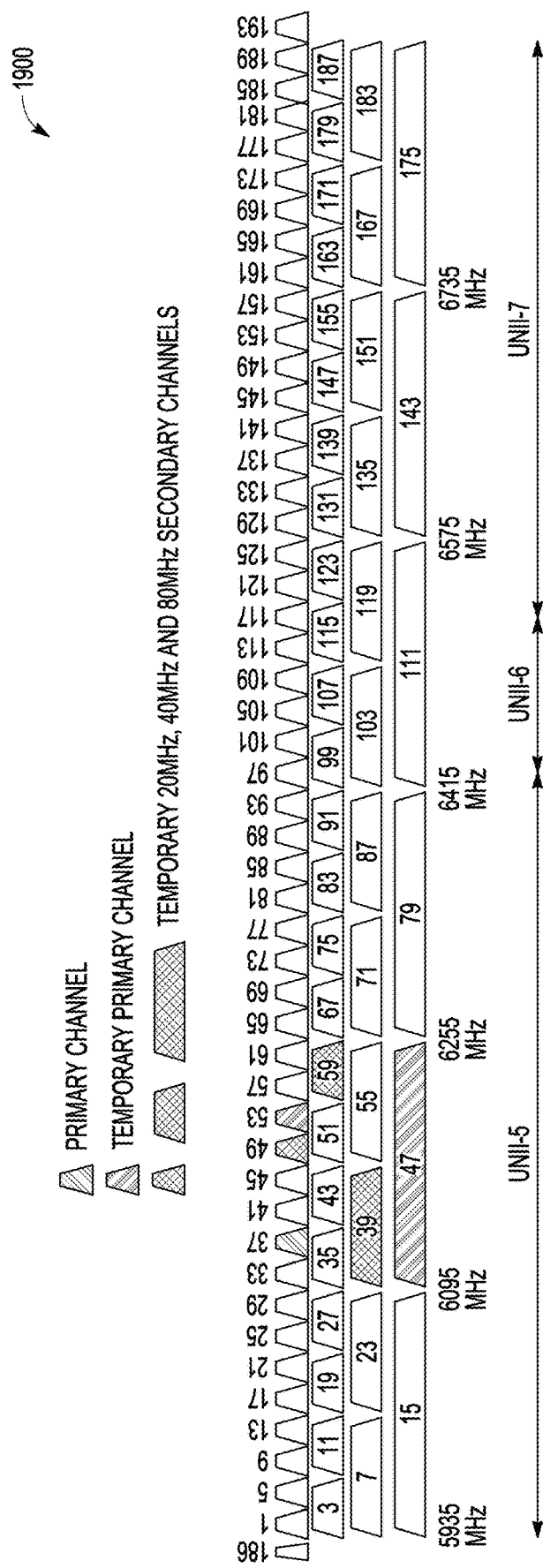
FIG. 19 illustrates example arrangements of channels in accordance with some embodiments.
Figure 20:
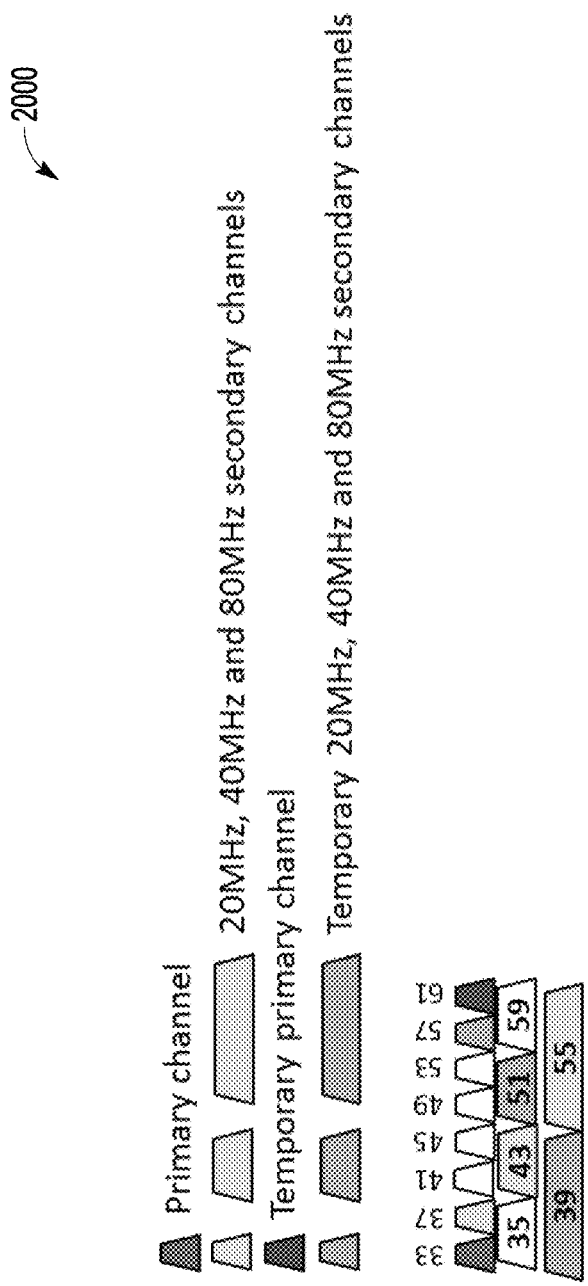
FIG. 20 illustrates example arrangements of channels in accordance with some embodiments.
Figure 21:
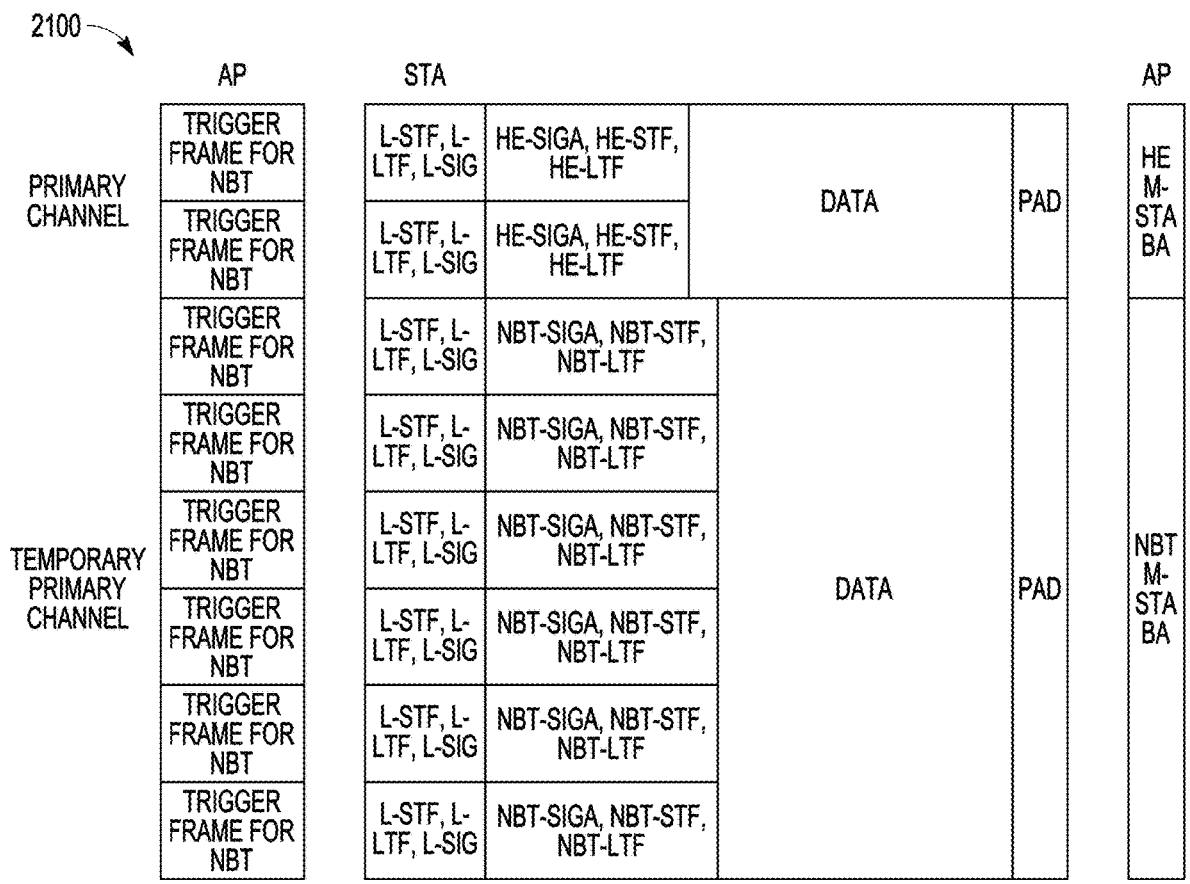
FIG. 21 illustrates example arrangements of channels in accordance with some embodiments.
Figure 23:
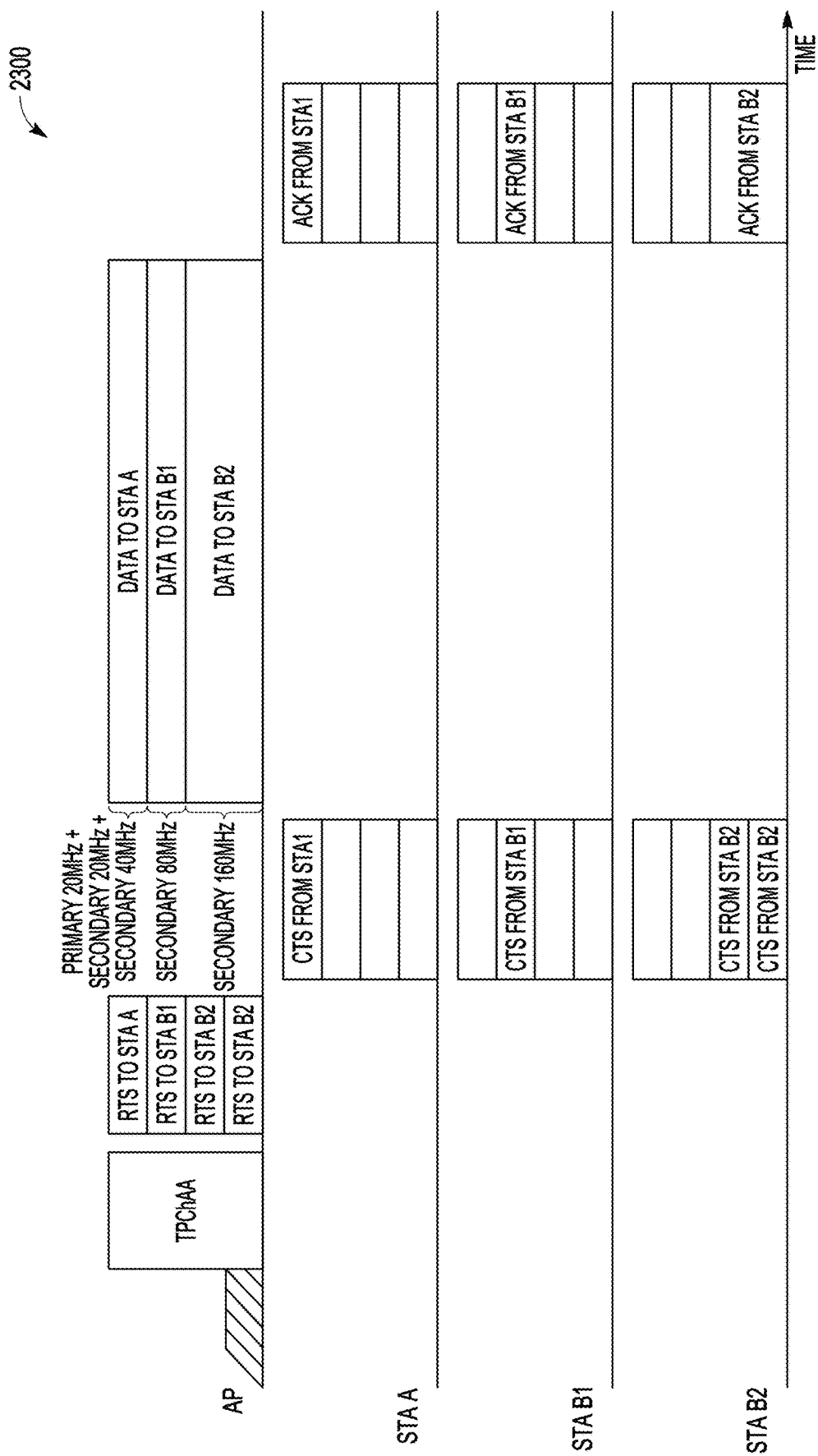
FIG. 23 illustrates example elements that may be exchanged between an access point (AP) and one or more stations (STAs) in accordance with some embodiments.

17 illustrates example arrangements of channels in accordance with some embodiments. FIGS. 18A, 18B and 18C illustrate example arrangements of channels in accordance with some embodiments. FIG. 19 illustrates example arrangements of channels in accordance with some embodiments. FIG. 20 illustrates example arrangements of channels in accordance with some embodiments. FIG. 21 illustrates example arrangements of channels in accordance with some embodiments. FIG. 22 illustrates example arrangements of channels in accordance with some embodiments. FIG. 23 illustrates example elements that may be exchanged between an access point (AP) and one or more stations (STAs) in accordance with some embodiments.

It should be noted that the examples shown in FIGS. 9-23 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-23. Although some of the elements shown in the examples of FIGS. 9-23 may be included in a WLAN standard, Wi-Fi standard, 802.11 standard, and/or other standard, embodiments are not limited to usage of such elements that are included in standards.

In some embodiments, multi-link association with APs 102 in a multi-link set may be used. It should be noted that references herein to "multi-link association" and to "multi-link setup" are not limiting. For instance, in some of the descriptions herein, one or more techniques, operations and/or methods may be performed as part of a multi-link setup. It is understood that one or more of those techniques, operations and/or methods may be performed as part of a multi-link association, as part of another process or otherwise, in some embodiments.

In addition, in some of the descriptions herein, one or more techniques, operations and/or methods may be performed as part of a multi-link association. It is understood that one or more of those techniques, operations and/or methods may be performed as part of a multi-link setup, as part of another process or otherwise, in some embodiments.

In addition, in some descriptions herein, one or more techniques, operations and/or methods may be performed as part of a process. It is understood that one or more of those techniques, operations and/or methods may be performed as part of another process, in some embodiments. In addition, one or more of those techniques, operations and/or methods may be performed, but may not necessarily be related to any particular process, in some embodiments.

In some embodiments, an association framework may work for multiple APs 502 which are collocated in an AP device that supports simultaneous operations to one or more non-AP devices. Between the AP 502 device and one non-AP device, there are different interfaces, where each interface is defined by 3 tuples: the BSS configuration of the AP 502, AP info (like MAC address), and STA info (like MAC address).

In some embodiments, an association framework may help to figure out two important functionalities of association: routing and capability exchange of different interfaces. Specifically, for routing, the association modifies the existing question of "Which AP is serving STA X?" to "which AP device is serving STA device X?"

In some embodiments, multi-band activation signaling may be used. In some embodiments, a non-AP device can have several interfaces with an AP device. The non-AP device and the AP device can decide which interface to use or not to use (which may be referred to as "activated" in some cases) at a specific time based on various signaling.

Some embodiments may be related to collocated APs 502 in an AP device and for simultaneous operation of non-AP devices to achieve seamless operation between the AP device and the non-AP device. However, in a more general setting, both assumptions are not needed. The seamless operation for management and data plane can still help when non-AP device does not support simultaneous operation across interfaces. The seamless operation for management and data plane can also help when APs 502 are not in a collocated AP device, and we will then have a more efficient roaming operation without the need of renegotiation.

In some cases, the signaling may not necessarily consider the case that there are stages that an interface has not achieved capability exchange due to the reason that the non-AP device has not been able to reach the AP 502 if we consider the case not only for collocated AP 502.

In some embodiments, a framework of association may be extended for multi-band operation. In some embodiments, one or more association techniques may be extended by building multiple interface/link association contexts for BSSs/APs in a multi-interface/multi-link set.

It should be noted that the term "multi-link set" may be used in some descriptions herein, but the scope of embodiments is not limited by this terminology. Other terminology may be used, in some cases, including but not limited to: a multi-link logical entity, a multi-link AP logical entity, a multi-link non-AP logical entity, and/or other. In some descriptions herein, the term "multi-link set" may be replaced by one of the above terms. In some descriptions herein, one of the above terms may be replaced by the term "multi-link set." In some cases, a concept described herein for a multi-link set may be applicable to one or more of the above. For instance, a multi-link set may include multiple APs in a description herein, and it is understood that the same description may be applicable to a multi-link AP logical entity that includes multiple APs 502, in some embodiments.

It should be noted that the terminology "link" may be used to better align with the *IEEE P802.1AX-Rev/D1.1 Bridges and Bridged Networks—Link Aggregation*, where each MAC and PHY interface is viewed as a link. However, we note that the definition of a link/interface in 802.11 context may still be defined, in some embodiments, by 3 tuples: the BSS configuration of the AP, AP info (like MAC address), and STA info (like MAC address). In some descriptions herein, we use the term "link", but the definition may be essentially the same as an interface in some cases. Note that other terms may be used for the concept of the 3 tuples, but the concept covered by some embodiments described herein still holds.

The multi-link set is defined in a general term such that collocated APs/BSSs or non-collocated APs/BSSs can be in the set. The association framework allows a non-AP device to have a single frame exchange to associate with any APs in a multi-link set and exchange information of different links (ex. BSS configuration, AP information of each link, non-AP STA information of each link, capability of each link, Tx/Rx constraints of different links).

In some embodiments, one or more APs 502 in the multi-link set can indicate the information of multi-link set. In some embodiments, one or more links can be established at a specific time, where the term "established" of a link means that: the AP device has all the information to enable data operation with the non-AP device in that link; the non-AP device has all the information to enable data operation with the AP device in that link. Note that other terms may be used for the concept for both sides to have all the necessary information of a link, but the concept covered herein still holds.

In some embodiments, depending on the exchange Tx/Rx constraints of different links, among the established links, both the AP device and non-AP device agree to start data operation in certain set of the established links based on switching/power save. In some embodiments, a common device address used for DS mapping will be signaled by the non-AP EHT STA when associated APs in a multi-link set. In some embodiments, the common device address is a MAC address that can be used by the distribution system (DS) to transfer the packets. In some embodiments, all the EHT APs in a multi-link set will have a common address used to access distribution system medium (DSM), and it can be up to implementation how APs (collocated or non-collocated) in a multi-link set will achieve this.

A non-limiting example 900 is shown in FIG. 9.

In some embodiments, one or more of the techniques, operations and/or methods described herein may be applicable to a general scenario. In some embodiments, APs/BSSs in the multi-link set can be collocated or non-collocated. In some embodiments, a non-AP device can negotiate Tx/Rx constraints across the link and is not limited to have support for simultaneous operation across links.

Some embodiments may be related to Multi-band Operation. Multi-band operation has been decided as one of the main topic for EHT to increase peak throughput. Three scenarios are shown in FIG. 10. In one scenario (referred to without limitation as Scenario 1), STA1 does not have concurrent capability on multiple interfaces. However, for a negotiated TID for data transmission, STA1 can switch the interface to transmit and receive the data of the TID. This increases the opportunity for the STA 504 to access the medium and increase the throughput. In one scenario (referred to without limitation as Scenario 2), AP1 and STA1 both have concurrent capability on multiple interfaces. However, for each negotiated TID for data transmission, the data of a specific TID can only be transmitted on one interface at a specific time. AP1 or STA1 can switch the interface used by a specific TID to transmit and receive. Since at one time, STA 1 can transmit or receive on both interfaces, the peak throughput at one time is increased. However, the peak throughput of a specific application, which is mapped to a TID, is still limited by the peak throughput provided by a specific interface. In one scenario (referred to without limitation as Scenario 3), AP1 and STA1 both have concurrent capability on multiple interfaces. Further, for each negotiated TID for data transmission, the data of a specific TID can be transmitted on multiple interfaces at a specific time. Since at one time, STA 1 can transmit or receive on both interfaces for a specific TID, which is mapped to a specific application, the peak throughput of a specific application at one time is increased.

Some embodiments may be related to fragmentation operation. Two types of frames can be fragmented: MSDU, MMPDU. 11ax allows A-MSDU to be fragmented as well. Note that MMPDU is basically the management frame. A-MSDU is the aggregated MSDU. On the high level, there are two types of fragmentation. Static fragmentation allows static and same fragmentation size for the lifetime of each fragment except the last fragments.

Dynamic fragmentation is defined in 27.3 Fragmentation and defragmentation by 11ax to support the following additional features: unequal length of fragments, but the length of the first fragment shall be greater than or equal to the minimum fragment size indicated in the Minimum Fragment Size subfield of the HE Capabilities Information field in the HE Capabilities element sent by the recipient STA; fragmentation under HT-immediate block ack agreement; fragments in an A-MPDU that is not a S-MPDU.

A non-limiting example of a definition of S-MPDU is given as—(11ah)single medium access control (MAC) protocol data unit ((11ah)S-MPDU): An MPDU that is the only MPDU in an aggregate MPDU (A-MPDU)(11ah) and that is carried in an A-MPDU subframe with the EOF subfield of the MPDU delimiter field equal to 1. Three levels of dynamic fragmentation are defined below. An HE STA can negotiate the use of different levels of dynamic fragmentation: Level 0: no support of dynamic fragmentation; Level 1: support for one dynamic fragment that is contained within an MPDU (that is not in an AMPDU) or S-MPDU, no support for dynamic fragments within an A-MPDU that is not an S-MPDU; Level 2: support for up to one dynamic fragment for each MSDU, each A-MSDU (if supported by the recipient) and one MMPDU (see 27.10.4 (Multi-TID A-MPDU and ack-enabled A-MPDU)) within an A-MPDU that is not an S-MPDU, where the A-MPDU contains at least one dynamic fragment and is sent under an HT-immediate block ack agreement; Level 3: support for up to 4 dynamic fragments for each MSDU and for each A-MSDU (if supported by the recipient) within an A-MPDU and up to one dynamic fragment for one MMPDU (see 27.10.4 (Multi-TID A-MPDU and ack-enabled A-MPDU)) in an A-MPDU that is not an S-MPDU, where the A-MPDU contains at least one dynamic fragment and is sent under an HT-immediate block ack agreement that has enabled dynamic level 3 fragmentation.

There are 8 capability parameters that control fragmentation operation as described below. Support of Fragmentation level 0, 1, 2, 3 as indicated in HE capabilities element. One capability parameter may be related to a minimum fragment size as indicated in HE capabilities element. One capability parameter may be related to capability of A-MSDU fragmentation as indicated in HE capabilities element. One capability parameter may be related to Nmax, which is the number of outstanding (defined below) MPDUs and A-MSDUs allowed by the receiver. Nmax=2^Maximum Number Of Fragmented MSDUs/A-MSDUs Exponent, where Maximum Number Of Fragmented MSDUs/A-MSDUs Exponent is indicated in the HE capabilities element. In some embodiments, the term outstanding refers to an MPDU containing all or part of an MSDU or A-MSDU for which transmission has been started, and for which delivery of the MSDU or A-MSDU has not yet been completed (i.e., an acknowledgment of the final fragment has not been received and the MSDU, A-MSDU or MMPDU has not been discarded due to retries, lifetime, or for some other reason).

One capability parameter may be related to dot11FragmentationThreshold, which is an internal control variable of the transmitter, determines the threshold required for fragment MSDU or MMPDU. One capability parameter may be related to dot11EDCATableMSDULifetime, which is an internal control variable of the transmitter, and timer value: a QoS STA 504 shall maintain a transmit MSDU timer for each MSDU passed to the MAC; dot11EDCATableMSDULifetime specifies the maximum amount of time allowed to transmit an MSDU for a given AC. The transmit MSDU timer shall be started when the MSDU is passed to the MAC. If the value of this timer exceeds the appropriate entry in dot11EDCATableMSDULifetime, then the MSDU, or any remaining, undelivered fragments of that MSDU, shall be discarded by the source STA 504 without any further attempt to complete delivery of that MSDU.

One capability parameter may be related to dot11MaxTransmitLifetime, which is an internal control variable of the transmitter, and timer value as described below: the source STA 504 shall maintain a transmit MSDU timer for each MSDU being transmitted. The attribute dot11MaxTransmitMSDULifetime specifies the maximum amount of time allowed to transmit an MSDU. The timer starts on the initial attempt to transmit the first fragment of the MSDU. If the timer exceeds dot11MaxTransmitMSDULifetime, then all remaining fragments are discarded by the source STA 504 and no attempt is made to complete transmission of the MSDU.

One capability parameter may be related to dot11MaxReceiveLifetime, which is an internal control variable of the receiver, and timer value: the destination STA 504 shall maintain a Receive Timer for each MSDU or MMPDU being received, for a minimum of three MSDUs or MMPDUs. The STA 504 may implement additional timers to be able to receive additional concurrent MSDUs or MMPDUs. The receiving STA 504 shall discard all fragments that are part of an MSDU or MMPDU for which a timer is also not maintained. There is also dot11MaxReceiveLifetime, that specifies the maximum amount of time allowed to receive an MSDU. The receive MSDU or MMPDU timer starts on the reception of the first fragment of the MSDU or MMPDU. If the receive MSDU timer exceeds dot11MaxReceiveLifetime, then all received fragments of this MSDU or MMPDU are discarded by the destination STA.

For static fragmentation, and level 1 and level 2 of dynamic fragmentation, the fragments must be transmitted in order. For level 3 of dynamic fragmentation, the fragments are not required to be transmitted in order. For dynamic fragmentation, the transmitter can change the size of the fragments based on the following rules. An originator STA 504 may retransmit the full MSDU, A-MSDU or MMPDU when all the previously transmitted dynamic fragments of that MSDU, A-MSDU or MMPDU have explicitly failed at the receiving STA. An originator STA 504 may retransmit a failed fragment when one or more of the previously transmitted fragments of that MSDU, A-MSDU, or MMPDU have explicitly failed at the receiving STA 504 (see below for a definition of this term). The frame body length and contents of the retransmitted fragment shall be the same as the initially transmitted fragment and shall remain fixed for the lifetime of the MSDU, A-MSDU or MMPDU at that STA 504 except when all the fragments preceding the initial transmitted fragment were successfully received and all the fragments following the initial transmitted fragment have either explicitly failed or have not been transmitted, in which case the frame body length and contents of the retransmitted fragment may be different from the initially transmitted fragment.

In some embodiments, under Multi-band operation, rules for fragmentation may be clarified under the following two situations. What is the rule after TID switching? What is the rule under TID aggregation across interface? Since different interface may currently have different capability or different internal control variables. How these capability indication control the fragmentation operation under Multi-band may be clarified.

Some embodiments may be related to how in order delivery of fragments can be still maintained in the multi-band consideration to avoid complexity. Some embodiments may be related to how fragments transmission/reception status can be maintained under switching and aggregation scenarios. Some embodiments may be related to how 8 different capabilities for fragmentation operation will work under switching and aggregation scenarios.

In some embodiments, under aggregation operation, in order delivery of fragments in a MSDU, A-MSDU, or MMPDU is maintained. A capability can be indicated by the STA 504 for support of not in order delivery of fragments under aggregation operation. The indication can be implicit. For example, out of order delivery is only supported if STA 504 supports level 3 dynamic fragmentation. The indication can be explicit. For example, a bit in the capability element for EHT can be used for this purpose. The consideration will help the receiver side to avoid the complexity of maintaining out of order delivery of fragments, which is generally not supported by vendors. In some embodiments, under aggregation operation, if a fragment of a MSDU, A-MSDU, or MMPDU, is explicitly acknowledged in one interface, then the remaining fragments are transmitted only in that interface. A capability bit can be indicated by the STA 504 for support of handling fragments of a MSDU, A-MSDU, or MMDU, transmitted in different interfaces under aggregation operation. The indication can be explicit. For example, a bit in the capability element for EHT can be used for this purpose. The consideration may help the receiver side to avoid the complexity of combining fragments from different interfaces and maintaining in order delivery.

Some embodiments may be related to fragmentation status when switching operation is used. Under switching operation, options may be provided for the status of acknowledged fragments on the transmitter side and the status of received fragments on the receiver side. Different options may be used based on different device capability. Transmitter or receiver may indicate if option 1 or option 2 is used explicitly. In Option 1, for a fragmented MSDU, A-MSDU, or MMPDU, the transmitter transfers the status of acknowledged fragments, and the receiver transfers the status of received fragments after switching interfaces. In Option 2, for a fragmented MSDU, A-MSDU, or MMPDU, the transmitter and receiver discards existing fragments and restart transmission and reception of an unfinished fragmented MSDU, A-MSDU, MMPDU. Under switching operation, certain delay is enforced before switching operation can be done to guarantee fragmentation operation will work. The indication of delay can be explicit. For example, a field in the element defined for EHT can be used for this purpose. The indication of delay can be implicit. For example, spec defined a common delay.

Some embodiments may be related to a flushing mechanism that can help the receiver to discard all the existing fragments and work with options above to simplify switching and aggregation operation. A flushing mechanism where transmitter can send a whole MSDU, A-MSDU, or MMPDU in any interface after some fragments of the MSDU, A-MSDU, or MMPDU have been explicitly acknowledged in any interface. The receiver will discard all previous received fragments of a MSDU, A-MSDU, or MMPDU, if the whole MSDU, A-MSDU, or MMPDU is received. The whole MSDU, A-MSDU, or MMPDU will have more fragment subfield of frame control field set to 0 and fragment number subfield in sequence control field set to 0. The whole MSDU, A-MSDU, or MMPDU can be transmitted in any interface without the need of following rules proposed above for switching and aggregation.

Some embodiments may be related to an indication of control and capability parameters that control the fragmentation operation for the following 8 control and capability parameters that are related to the fragmentation: support of Fragmentation level 0, 1, 2, 3 as indicated in HE capabilities element; minimum fragment size as indicated in HE capabilities element; capability of A-MSDU fragmentation as indicated in HE capabilities element; Nmax, which is the number of outstanding (defined below) MPDUs and A-MSDUs allowed by the receiver; dot11FragmentationThreshold; dot11EDCATableMSDULifetime and timer; dot11MaxTransmitLifetime and timer; and dot11MaxReceiveLifetime and timer. Embodiments are not limited to usage of these parameters. Some embodiments may use one or more of those parameters and/or other parameters.

In some embodiments, for each capability, indication is provided to specify one of the following two options. In Option 1, a same capability value is used across interfaces. The indication can be implicit. For example, the spec mandates that the capability used across interfaces needs to be the same. The indication can be explicit. For example, a bit to indicate the capability used in an interface is used across all interfaces. In Option 2, different capability values may be used across interfaces. Different options may be used for different control and capability parameters. For all options, constraints imposed by control and capability parameters need to be satisfied for each interface. Fragments of a MSDU, A-MSDU, or MMPDU can be transmitted across a set of interfaces only if the fragments of a MSDU, A-MSDU, or MMPDU meet the constraints imposed by control and capability parameters of the set of interfaces. Under switching operation, if switching to an interface with different constraints imposed by control and capability parameters, then all fragments of a specific A-MSDU, MSDU, MMPDU, that do not satisfy the constraints of the interface are discarded.

Some embodiments may be related to one or more designs for the control and capability parameters. For the following capabilities, same (option 1 above) or different capabilities (option 2 above) may be used: support of Fragmentation level 0, 1, 2, 3 as indicated in HE capabilities element; minimum fragment size as indicated in HE capabilities element; capability of A-MSDU fragmentation as indicated in HE capabilities element. For Nmax, one value represents the number of outstanding MPDUs and A-MSDUs allowed by the receiver across interfaces. For dot11FragmentationThreshold: the transmitter uses the same threshold across interfaces; the transmitter uses different threshold across interfaces. However, when switching from an interface with larger threshold to an interface with smaller threshold, the transmitter will notify the receiver about the constraints so that both transmitter and receiver know which sets of fragments need to be discarded. For dot11EDCATableMSDULifetime and timer, one timer is maintained for a MSDU across interface. One dot11EDCATableMSDULifetime is used by the transmitter across interfaces. For dot11MaxTransmitLifetime and timer, one timer is maintained for transmitting a MSDU across interface. One dot11MaxTransmitLifetime is used by the transmitter across interfaces. For dot11MaxReceiveLifetime and timer, one timer is maintained for receiving a MSDU across interface. One dot11MaxReceiveLifetime is used by the receiver across interfaces.

Some embodiments may be related to multi-band in EHT. A feature in the scope of EHT is to enable Multi-band data aggregation. A typical scenario for MAC aggregation is shown in FIG. 11, wherein the AP 502 and the STA 504 have multiple interfaces to exchange data simultaneously. For example, the AP 502 and the STA 504 can negotiate frames related to TID1, such as MU-BAR, BAR, data frame, to be transmitted simultaneously across different interfaces. An example at a specific time frame is shown in FIG. 12.

Some embodiments may be related to Multi-band Aggregation operation, one or more of the following may be used: allow shared transmit buffer control on transmitter side and receive reordering buffer control on receiver side for a TID across the interfaces; allow BA Bitmap size of a TID across interfaces different from the shared buffer size. An example is shown in FIG. 13.

In some embodiments, a total receive reordering buffer size of 512 across the interface may be used, and the maximum BA bitmap is 256, which is the maximum value allowed by 11n/ac/ax implementation. It should be noted that embodiments are not limited to the numbers used in this example and elsewhere herein (such as 256, 512 and/or other).

A non-limiting example is shown in FIG. 14 for a negotiated receive reordering buffer. As shown in the example of FIG. 14, there are two gaps in the buffer: data with SN from 0 to 19 and data with SN from 492 to 511. If the transmitter aggregates data with SN from 0 to 19 and data from SN 492 to 511, then receiver cannot acknowledge all the data in one BA bitmap because a BA bitmap with maximum size 256 can only acknowledge received data from a SN value, say x, to another SN value, say x+511.

In some embodiments, one or more options may be used to allow receiver of data to acknowledge multiple data with SN range beyond 256. In one option, a larger BA bitmap size to acknowledge data with a bigger range. In another option, multiple BA bitmap for a TID can be aggregated in one response to the transmitter of data. A smaller BA bitmap size than currently supported (compared with 256) may be used to reduce the overhead of bitmap aggregation (the current supported BA bitmap size is 32, 64, 128, 256). In another option, the receiver of data can indicate the range, which is equal to the largest SN for a TID minus the smallest SN for a TID plus 1, that is allowed in one A-MPDU. In another option, an index (including but not limited to an A-MPDU index) may be used. A new BA variant to indicate bitmap with bit representing reception of MPDU with a certain index.

Some descriptions below may be related to the design of the receiver. In some embodiments, a BA bitmap size larger than 256 may be used. The BA bitmap size can be any value equal to basic_unit*integer. A basic unit can be 8, 16, 32, 64, 128, or 256. A basic unit can be 8*(any integer larger than 0). The largest BA bitmap size may be bounded by (Maximum sequence number value+1)/2.

In some embodiments, an additional BA bitmap size smaller than 256 may be used. The BA bitmap size can be any value equal to basic unit*integer. The basic unit can be 8, 16, 32, 64, 128, or 256. The basic unit can be 8*(any integer larger than 0). The smallest BA bitmap size may be lower bounded by 8.

In some embodiments, to indicate new designed BA bitmap length, an existing compressed BlockAck variant (and/or other) may be modified to do the indication. For instance, a fragment number subfield can be used for the purpose. In some embodiments, to indicate new designed BA bitmap length, a new compressed BlockAck variant (and/or other) may be used to do the indication. A field may be used to indicate the starting sequence number. A field may be used to indicate the BA bitmap length. In some embodiments, aggregation of more than one BA bitmap for one TID may be used. An existing (and/or legacy) Multi-TID Blockack variant can be modified to achieve this purpose.

An example of an existing (and/or legacy) Multi-TID BlockAck variant 1600 is shown in FIG. 16. One or more reserved bits in Per TID Info can indicate a number of repeat Block Ack Starting Sequence Control and BlockAck Bitmap after Per TID Info. A fragment number field in Block Ack Starting sequence control can indicate the size of the block Ack bitmap. In some embodiments, a new Aggregated BA variant (and/or other) can be used to enable this option. A list of (control, BA bitmap) tuple are included in this new variant. BA bitmap control will have a field to indicate: bitmap size, starting sequence number, a number of fragments for one data with a specific SN, and/or other. Additional TID control can be added, such as: TID control indicates number of (control, BA bitmap) tuples after TID control; TID control indicates the TID information; and/or other. In some embodiments, an existing (and/or legacy) Multi-STA blockack variant (and/or other) can be modified to achieve this purpose. An example of an existing (and/or legacy) Multi-STA BlockAck variant is shown in 1620 in FIG. 16.

In some embodiments, reserved bits in Per TID Info can indicate: number of repeat Block Ack Starting Sequence Control and BlockAck Bitmap after Per AID TID Info. A fragment number field in Block Ack Starting sequence control can indicate the size of the block Ack bitmap.

In some embodiments, a Multi-STA blockack variant can be used to achieve this purpose for one blockAck to multiple STAs 504. A list of (control, BA bitmap) tuple are included in this new variant. The BA bitmap control will have a field to indicate: bitmap size, starting sequence number, a number of fragments for one data with a specific SN, and/or other. Additional AID TID control can be added, including one or more of: AID TID control indicates number of (control, BA bitmap) tuples after TID control, AID TID control indicates the TID information, AID TID control indicates the AID information, and/or other.

In some embodiments, a receiver of data indicates the range, which is equal to the largest SN for a TID minus the smallest SN for a TID plus 1, that is allowed in one A-MPDU. The range can be indicated in a capability element designed for EHT. The transmitter shall not send A-MPDU to the receiver with largest SN for a TID minus the smallest SN for a TID plus 1 beyond the indicated range.

Some embodiments may be related to the transmitter. In some embodiments, solicitation of aggregation of more than one BA bitmap for one TID may be allowed/used. A Multi-TID BlockAckReq variant (and/or other) can be redesigned to enable this option. An existing BAR information field for Multi-TID BlockAckReq 1640 is shown in FIG. 16. One or more reserved bits in Per TID Info can be used to Number of repeat Block Ack Starting Sequence Control after Per TID Info. A fragment number field in Block Ack Starting sequence control can indicate the size of the block Ack bitmap. A BAR variant can be used/designed to enable this option. A BAR control field indicates the new variants. A BAR information field contains a list of BA control information, which contains one or more of: starting sequence number, BA bitmap size, a number of fragments for one data with a specific SN, and/or other. Additional TID control can be added in BAR information, including one or more of: TID control indicates number of BA control information tuples after TID control; TID control indicates the TID information; and/or other.

Some embodiments may be related to usage of an index, including but not limited to an A-MPDU index and/or MPDU index. The MPDU index is added to label each MPDU in an A-MPDU. The MPDU index for each MPDU in an A-MPDU can be put in the delimiter of A-MPDU and/or elsewhere. A new A-MPDU delimiter can be used for this purpose since there is not enough bits in the current delimiter of A-MPDU. The new A-MPDU delimiter may have one or more of the following fields: one field has 8 bits of delimiter signature with a pattern (including but limited to a pattern of 0x4E); an MPDU length; an MPDU index; a CRC; and/or other. A PHY preamble may indicate whether the new A-MPDU delimiter format is used or not. A new data format can be used for this purpose. The new data format may have the MPDU index field. A new BlockAck variant with a bitmap may be used to indicate reception of MPDUs in an A-MPDU based on the MPDU index. The Xth bit in the bitmap may correspond to the reception status of MPDU with index x in an A-MPDU. Bit x is set to 1 to indicate received and set to 0 to indicate not received.

In some embodiments, an existing compressed blockack (and/or other) with a bitmap can be redesigned to indicate reception of MPDUs in an A-MPDU based on the MPDU index. The Xth bit in the bitmap corresponds to the reception status of MPDU with index x in an A-MPDU. The bit is set to 1 to indicate received and set to 0 to indicate not received. The maximum value of MPDU index in an A-MPDU can be indicate by the receiver. The indication can be in the capability element of EHT.

In some cases, a topic for next generation Wi-Fi is to consider the extension of maximum bandwidth to 320 MHz with operation modes like contiguous 320 MHz or two segment design of 160+160 MHz. It is therefore expected that NBT STAs 504 will be able to operate either at 320 MHz or with a lower BW but within a DL or UL PPDU that is 320 MHz. There will also be HE STAs 504 at 6 GHz that will be capable of operating up to 80 or 160 MHz BW but not with a 320 MHz PPDU. Because of this, without making changes, a 320 MHz PPDU will be able to be destined only to XT STAs 504 in DL, and an UL 320 MHz PPDU will only be transmitted by triggered NBT clients. The situation will be similar with 16 spatial streams.

Figure 17:
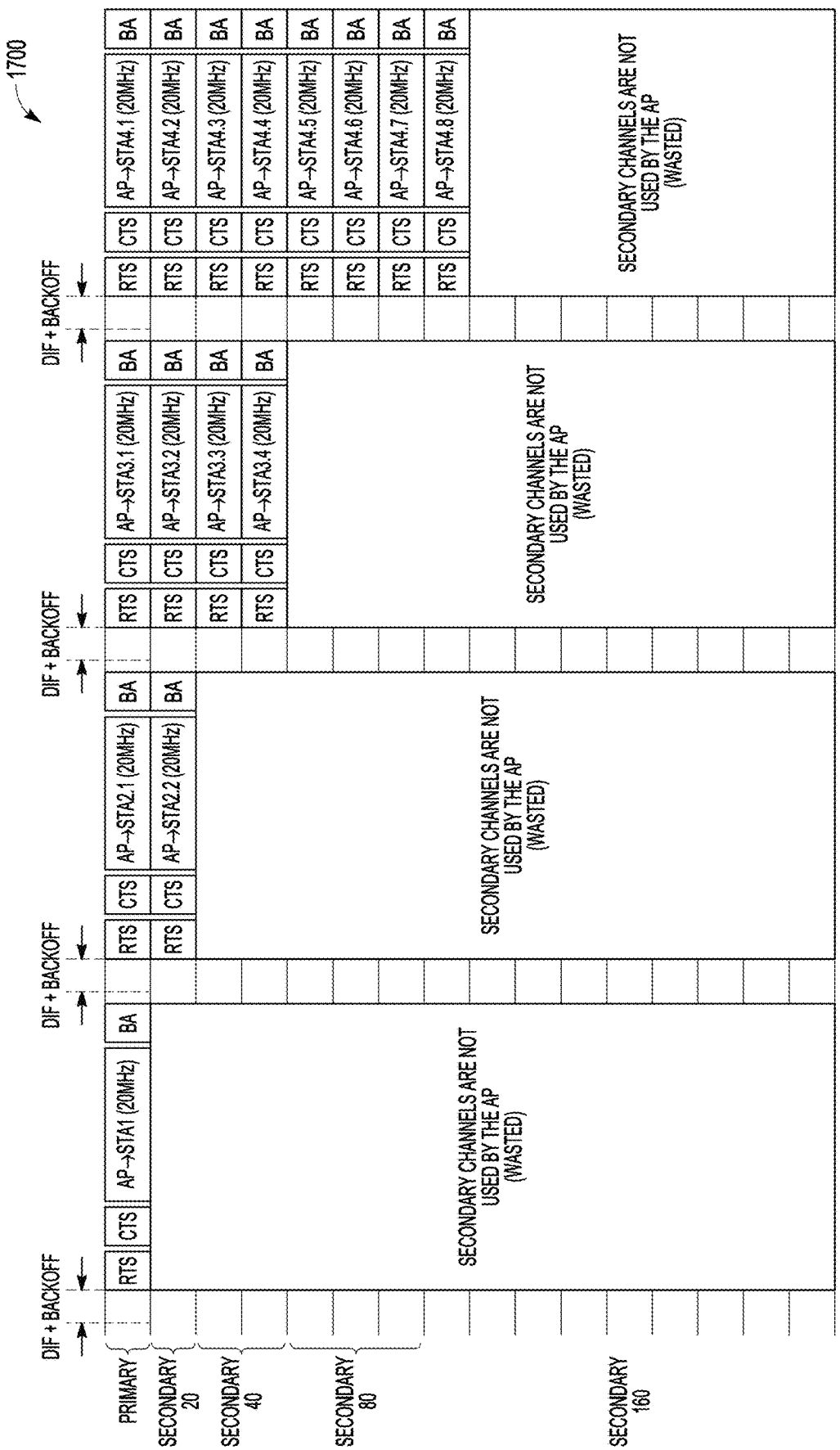
FIG. 17 illustrates example arrangements of channels in accordance with some embodiments.

This generates scheduling limitations for the AP 502, who will need to group STAs 504 based on their PHY generation support. This also leads to spectrum underutilization if one of the scheduled stations (STAs) 504 do not support 320 MHz channel bandwidth (e.g., 802.11n, 802.11ac or 802.11ax), then even if a wider channel bandwidth is available, the access point (AP) 502 of a basic service set (BSS) may not be able to always use the entire 320 MHz channel bandwidth. In this case, the AP 502 has to transmit data in 20, 40 or 80 MHz channel bandwidth with the secondary channels under-utilization. As shown in FIG. 17, if STA1 only supports up to 20 MHz channel bandwidth, AP 502 can only send a 20 MHz PPDU to STA1 with the rest available channel bandwidth wasted. If AP 502 is going to send packet to STA2.1 and STA2.2 and one or more STAs 504 among STA2.1 and STA2.2 only supports up to 40 MHz channel bandwidth, AP 502 can only send a 40 MHz PPDU to STA2.1 and STA2.2 with the rest available channel bandwidth wasted. If AP 502 is going to send packet to STA 3.1, STA3.2, STA3.3 and 3.4 and one or more STAs 504 among the STAs 504 only supports up to 80 MHz channel bandwidth, AP 502 can only send a 80 MHz PPDU to the STAs 504 with the rest available channel bandwidth wasted. If AP 502 is going to send packet to STA 4.1, STA4.2 STA4.3, STA4.4, STA4.5, STA 4.6, STA4.7 and STA 4.8, and one or more STAs 504 among the STAs 504 only supports up to 160 MHz channel bandwidth, AP 502 can only send a 160

MHz PPDU to the STAs 504 with the rest available channel bandwidth wasted. FIG. 17 illustrates an example in which secondary channels may be under-utilized due to the support bandwidth limitation of the associated STAs.

In some embodiments, a technique may be used in order to generate a DL PPDU that will be transmitted to a mix of HE and NBT STAs. In some embodiments, in order to enable generation generate of a DL PPDU that will be transmitted to a mix of HE and NBT STAs 504: a long-term negotiation between the AP 502 and each STAs 504 or between the AP 502 and a group of STAs 504, so that the STAs 504 know on which 20 MHz channels they will be able to operate (these channels represent a segment). The non-primary operation defined in 11ax for 20 MHz-only STAs 504 can be extended for this purpose. It consists of a TWT negotiation, where the TWT channel field describes the channel that will be used by the STA 504 during the TWT service period. This TWT service period can be always active or can be periodic. Once the TWT session is negotiated and agreed, during the TWT service period, the STA 504 will change its operating BW in order to operate on the channel indicated in the TWT element used in the negotiation (this channel will be a temporary primary channel for this STA 504).

In some embodiments, in order to enable generation generate of a DL PPDU that will be transmitted to a mix of HE and NBT STAs 504: a control frame, which may be named "Temporary Primary Channel Assignment Announcement (TPChAA)" and/or other, is also proposed as an another method to inform the STAs 504 that on which 20 MHz channels they will be able to operate by simply sending this new control fame.

In some embodiments, in order to enable generation generate of a DL PPDU that will be transmitted to a mix of HE and NBT STAs 504: the AP 502 can group STAs 504 that support the same PHY modes, for instance, on one channel the NBT STAs 504, and on another channel, the XT STAs 504.

In some embodiments, in order to enable generation generate of a DL PPDU that will be transmitted to a mix of HE and NBT STAs 504: the (possibly 320 MHz) PPDU transmission may be modified, so that it is the simultaneous transmission on each segment (one for HE and one that are for NBT), of 2 PPDUs, possibly of different format (one HE PPDU and one NBT PPDU). The OFDM symbol boundaries alignment, including the alignment of the transition between 1×OFDM symb and 4×OFDM symb in the preamble can be decided to be aligned across all channels in order to reduce inter-carrier interference generated at the transmitter side (and to be able to use a single FFT at the transmitter for the entire BW), or can be decided not to necessarily be aligned. This would be a standard decision. The end of the PPDU shall align across the different channels, and current padding can be used for that purpose. The scheduled response shall also be aligned and its transmission is scheduled per bandwidth occupied by a group of HE or NBT STAs. The parameters included in the SIG fields of a segment relate only to that segment and not to the entire PPDU (the BW field is set to the BW of the segment and not the BW of the total PPDU).

In some embodiments, in order to enable generation generate of a DL PPDU that will be transmitted to a mix of HE and NBT STAs 504, a DL scenario in which an AP 502 transmits simultaneously on 2 segments to 2 groups of STAs 504 may be applicable. This also applies to an UL scenario, where an AP 502 transmits first simultaneously 2 triggers (one on each segment) and SIFS time after the end of the PPDU containing the 2 triggers, each group of STAs 504 transmit an UL TB PPDU simultaneously, but on each segment separately.

In some embodiments, a PPDU transmission over a bandwidth higher than 20 MHz with different PPDU formats on different 20 MHz channel may be used, but with timing (at least for PPDU boundaries (start and end), but also possibly on preamble parts) and frequency alignment. The proposal is illustrated in FIGS. 18A, 18B and 18C with different examples. In 1800 of FIG. 18A, an example of PPDU transmission made of an HE PPDU on the first 80 MHz and of an NBT PPDU on the second 80 MHz is shown. The NET STAs 504 are operating temporarily at the start of the PPDU transmission on the temporary primary channel, and will be receiving only the red part of the signal (ignoring the blue). The HE STAs 504 are operating on the primary channel and will be receiving only the blue part of the signal (ignoring the red). In this example, the 2 PPDU formats are aligned on PPDU boundaries but also on preamble boundaries.

The scenario 1830 of FIG. 18B illustrates the same scenario as in 1800 of FIG. 18A, except that the alignment is only on PPDU boundaries (start and end), but not on preamble boundaries. The scenario 1860 of FIG. 18C illustrates the same scenario as in 1830 of FIG. 18B, except that the BW allocated to HE STAs 504 is only 40 MHz, while the BW allocated to NBT STAs 504 is 120 MHz. We propose that the primary channel, the secondary channels and the temporary channels and the temporary secondary channels are cleverly selected, so that the ratio of BW between HE and NBT STAs 504 can be dynamically configured per PPDU (basically alternating between 1830 and 1860 PPDU transmissions, only based on HE-SIGA info and NBT-SIGA info).

In some embodiments, long term negotiation may be used so that groups of STAs 504 supporting the same PHY capabilities and PHY PPDU formats are formed and are assigned a temporary primary channel, and temporary secondary channels. This list of temporary secondary channels are important in the case where the BW assigned to a group can be changed on a per-PPDU basis, by simply changing the BW field in the HE-SIGA or NBT-SIGA. One approach is to enhance the current 11ax solution based on TWT, by adding the secondary channels.

In some embodiments, there is a possibility for the AP 502 to gain access to the medium on multiple 20 MHz channels with the channel bonding protocol (full LBT on the primary channel, and PIFS LBT on secondary channels), and to transmit a PPDU constituted of different PPDU format on different 20 MHz channels. We call a segment a set of 20 MHz channels assigned to one particular group of STAs 504. In a non-limiting example: if the BW of the total PPDU is 160 MHz as in the examples in 1800, 1830, 1860, 80 MHz can be used for the transmission of an HE DL PPDU, and the other 80 MHz can be used for the transmission of an NBT DL PPDU.

In some embodiments, within each 80 MHz, the PPDU transmission follows the PPDU format used. For instance, the HE-SIGA is duplicated on all 4 channels within the 80 MHz assigned to HE STAs 504, and the NBT-SIGA is duplicated on all 4 channels within the 80 MHz assigned to NBT STAs 504. The parameters provided in the SIG field of each segment may relate only to this segment (BW, MCS, number of HE-LTFs . . . ). The response may be transmitted only on this segment.

In some embodiments, a set of constraints on frequency and time alignment between the PPDUs on the different segments assigned to HE or NBT may be used. Some constraints may be related to OFDM synchronization, and subcarrier spacing alignment. A single FFT and a single RF chain will likely be used for the 2 segments. Some constraints may be related to time alignment of start and end of PPDU on each segment. This is also true for the response that is sent after the PPDU. Some constraints may be related to: the L-SIG indication for each segment needs to be the same for the same duration. This is used to make sure that the whole transmission look like a PPDU although we can also view it as two PPDUs. Some constraints may be related to: if needed, time alignment on the fields in the preambles. Some constraints may be related to: having no alignment allows for instance to have HE operate with 4 spatial streams and NBT with 16 spatial streams. Some constraints may be related to: if needed, time alignment on OFDM symbols boundaries, in the data portion.

Some embodiments may be related to modification of TWT element to include in the negotiation for temporary primary channel operation, the indication of the temporary primary channel and the temporary secondary channel. The current 11ax solution includes the TWT channel field in the TWT element to identify the temporary primary channel that will be used during the TWT SP. This is a bitmap representing all the channels for the AP 502 operating BW from the lowest center frequency to the highest center frequency. Currently a single bit is set to one to indicate the channel that will be used as it is for 20 MHz only STAs 504 or 20 MHz operating STAs 504 (example a 320 MHz bitmap is made of 16 bits). The TWT element may be modified to be able to indicate more than one temporary operating channel and to indicate which of this channels is the temporary primary channel. Modification of the TWT element may be performed by setting multiple bits in the bitmap to 1 to represent all the channels that can be used, and to define in the specification that either the lowest or the highest center frequency 20 MHz channel is the temporary primary channel. Modification of the TWT element may be performed by setting only a single bit to 1 to indicate the temporary primary channel and to define in the specification a single way to derive what is the secondary 20 MHz, the secondary 40 MHz and the secondary 80 MHz, based on the total BW of the BSS, and the location of the temporary primary channel. This is illustrated in FIG. 19. Modification of the TWT element may be performed by explicitly signaling both the temporary primary channel, and the temporary bandwidth, with 2 bitmaps.

FIG. 19 illustrates an example of a mapping of secondary 20, 40 nd 80 MHz depending on the location of the temporary primary channel and the BSS operating BW, by following the distribution of the non-overlapping channels.

The example in FIG. 20 illustrates a combination of setting for primary channel, secondary channel, temporary primary channel and temporary secondary channels that would provide a large flexibility to modify the BW of the 2 segments each PPDU by simply indicating a different BW in the SIGA of each segment (the BW signaling the BW of the segment and not the BW of the total PPDU).

FIG. 20 illustrates an example of selection of temporary channels. It should be noted that if preamble puncture modes are used and/or extended that in next generation, the 20 MHz channels that are allocated to HE and the ones allocated to VHT may be interlaced.

FIG. 21 illustrates an example for the uplink, wherein a different trigger frame is transmitted on the different segments. The trigger frame does not need to be changed with this concept. Alignment of the end of the PPDU carrying the trigger frame can be handled with the different padding mechanisms. Alignment of the preambles, or of the OFDM symbol boundary can be handled by properly selecting the parameters in the trigger frame(s).

FIG. 21 illustrates an example for the uplink, wherein a different trigger frame is transmitted on the different segments.

Some embodiments may be related to alignment of OFDM symbol boundaries between different segments. The alignment of OFDM symbol boundaries is important in order to not generate inter-carrier interference between segments. It however generates some constraints on the generation of the signal and on the parameters. For DL MU PPDU, OFDM symbol boundaries alignment may be used/ensured: on the data portion, this is enabled by selecting the same GI parameters for HE and XT segments; on the transition in the preamble between the 1x symb and 4x symbols (this may be enabled by exploiting the padding available in RE-SIG B, and the same type of padding may be also defined in XT-SIGB.

In some embodiments, if HE-LTFs or XT-LTFs overlap with data on the other segment, we need to make sure that the duration of the HE-LTF or XT-LTF has the same duration and GI length than the data portion. One mode is the selection of 4×HE-LTF with the same GI duration as the one selected for the data portion.

FIG. 22 illustrates an example of OFDM symbol alignment. The yellow part corresponds to 1× symbols. The HE-SIGB padding, and the equivalent for XT can be used to ensure alignment. The darker green portion is the 4× part of the preamble for HE and XT, and the data portion is light green. By properly selecting the parameters for HE-SIG and XT-SIG (4×HE-LTF and same GI across segments), the alignment will be preserved even if data is transmitted together with XT-LTFs on different segments in the same OFDM symbol duration.

For UL TB PPDU, we also need to ensure the same alignments. There are no padding available before the transition between 1×OFDM and 4×OFDM symbol parts of the preamble, so we need to make sure that HE and XT 1×/4× transition aligns. If this is the case, we simply need to select the right parameters to ensure alignments of the 4× part, (see HE-LTF parameters in the previous paragraph). If the HE and XT 1×/4× transition does not align, the only solution would be to delay by one or multiple OFDM symbols the start of the RE-TB_PPDU, or XT TB PPDU, in order to ensure OFDM symbol alignment on the 1× and 4× parts.

Some embodiments may be related to a control frame exchange to enable the Temporary Primary Channel Assignment. The long term negotiation can also be replaced by sending a "Temporary Primary Channel Assignment Announcement (TPChAA)" before the data exchange between the AP 502 and STAs 504. As shown in FIG. 23, when the AP 502 is going to send data packet to 1) STA1, which is an HE device and only supports 80 MHz channel bandwidth and 2) STA B1 and STA B2, which are NBT devices and support up to 320 MHz channel bandwidth. Instead of sending packet to STA1 over the first 80 MHz channel, AP 502 will send (broadcast) a 320 MHz "Temporary Primary Channel Assignment Announcement (TPChAA)" frame, which can be defined as a new trigger frame with a new trigger type field value from the rest reserved bits as shown in the following Table 9-25b.

TABLE 9-25b

Trigger Type subfield encoding

| Trigger Type field value | Description |
| --- | --- |
| 0 | Basic Trigger |
| 1 | Beamforming Report Poll (BRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll |
| 8-15 | Reserved |

In some cases, a purpose of the TPChAA frame is to inform the STAs 504 (i.e., STAs B1 and B2 in this example) that the AP 502 will initiate multiplexing over secondary channels. The TPChAA frame indicates that AP 502 has downlink data packets to STAs B1 and B2, and is going to send duplicate RTSs or data frame (if there is no RTS) to STA B1 over secondary 80 MHz channel, and send duplicate RTS frame or 160 MHz data frame (if there is no RTS) to STA B2 over the secondary 160 MHz channel. The L-SIG field length of the TPChAA frame is set to the estimated time to transmit the pending TPChAA frame. The Duration/ID field in the MAC header of the TPChAA frame is set to the estimated time required to transmit the following RTS/CTS, plus the time to transmit the DL PPDU, plus the time to transmit the acknowledgement (ACK) for the DL PPDU, plus applicable SIFSs. The TPChAA frame may also indicate which secondary channel will be used as the tentative primary channel for each of the NBT STAs 504 that are involved in this procedure.

FIG. 23 illustrates a procedure of the MAC protocol with mixed mode transmission with HE and NBT STAs 504.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the STA included in a first plurality of STAs affiliated with a first multi-link logical entity (MLLE),
   wherein as part of the first MLLE, each STA of the first plurality of STAs share a common medium access control (MAC) data service interface to an upper layer, wherein the common MAC data service interface is associated with a common MAC address,
   wherein a plurality of links is established between the first MLLE and a second MLLE, wherein the second MLLE is affiliated with a second plurality of STAs, wherein one of the links of the plurality is established between each STA of the first plurality of STAs and one of the STAs of the second plurality of STAs,
   the apparatus comprising: memory; and processing circuitry, configured to:
   decode a first subset of a sequence of MAC protocol data units (MPDUs), wherein the MPDUs of the sequence are associated with a traffic identifier (TID) and are indexed by sequence numbers (SNs), wherein the MPDUs of the first subset are received on the link between the STA and the corresponding STA of the second plurality of STAs, wherein a second subset of the sequence of MPDUs is to be transmitted by another STA of the first plurality of STAs to one of the STAs of the second plurality of STAs;
   encode, for transmission to the corresponding STA of the second plurality of STAs, a block acknowledgement (BA) frame that includes:
   a number of BA bitmaps, configurable to values greater than or equal to one, and
   for each of the BA bitmaps, BA control information that indicates a number of bits of the BA bitmap, and further indicates a starting SN for the MPDUs corresponding to the bits of the BA bitmap.

2. The apparatus according to claim 1, the processing circuitry further configured to:
   encode the BA frame to include a BA variant that includes the BA bitmaps,
   wherein the BA variant is a Multi-STA BA variant or a Multi-TID (traffic identifier) BA variant.

3. The apparatus according to claim 1, the processing circuitry further configured to:
   encode, for transmission to the corresponding STA of the second plurality of STAs, a legacy BA request (BAR) variant that solicits usage of multiple BA bitmaps, wherein the legacy BAR variant is a Multi-STA BAR variant or a Multi-TID BAR variant, or
   encode, for transmission to the corresponding STA of the second plurality of STAs, a BAR variant that solicits usage of multiple BA bitmaps, wherein one or more bits of the BAR variant are allocated for the STA to solicit usage of multiple BA bitmaps.

4. The apparatus according to claim 3, the processing circuitry further configured to:
   encode the legacy BAR variant or the BAR variant to solicit usage of one or more BA bitmap sizes.

5. The apparatus according to claim 1, wherein:
   the number of bits in each of the BA bitmaps is one or more of: a multiple of 8, 512, and 1024,
   the sequence of MPDUs is configurable to include more than 256 MPDUs.

6. The apparatus according to claim 1, the processing circuitry further configured to:
   encode a legacy BA variant to indicate the number of bits of one or more of the BA bitmaps, wherein the legacy BA variant is a Compressed BA variant or a Multi-STA BA variant, or
   encode a BA variant to indicate the number of bits of one or more of the BA bitmaps, wherein one or more bits of the BA variant are allocated to indicate the number of bits of one or more of the BA bitmaps.

7. The apparatus according to claim 1, the processing circuitry further configured to:
   exchange signaling with the corresponding STA of the second plurality of STAs as part of a multi-link setup process between the first MLLE and the second MLLE, wherein the multi-link setup process establishes the links between the STAs of the first plurality of STAs and the corresponding STAs of the second plurality of STAs,
   wherein as part of the multi-link setup process, the processing circuitry is configured to:
   decode, from the corresponding STA of the second plurality of STAs, a multi-link setup Request Frame that includes capability information of the corresponding STA of the second plurality of STAs and capability information of the other STAs of the second plurality of STAs or MAC addresses of the other STAs of the second plurality of STAs; and encode, for transmission to the corresponding STA of the second plurality of STAs, a multi-link setup Response Frame that includes capability information of the STA and capability information of the other STAs of the first plurality of STAs or MAC addresses of the other STAs of the first plurality of STAs.

8. The apparatus according to claim 7, wherein the multi-link setup process enables the first MLLE to serve as an interface between a distribution system (DS) and the second MLLE.

9. The apparatus according to claim 1, wherein:
the STA is configured to operate in a frequency band that is different from a frequency band of at least one of the other STAs of the first plurality of STAs,
the STA is co-located with at least one of the other STAs of the first plurality of STAs and the STA is non-co-located with at least one of the other STAs of the first plurality of STAs, or
the processing circuitry is configured to perform operations for the STA and for at least one other STA of the first plurality of STAs.

10. The apparatus according to claim 1, wherein:
the processing circuitry includes a baseband processor to encode the A-MPDU,
the apparatus further comprises a transceiver to transmit the A-MPDU, and
the memory is configured to store at least a portion of the A-MPDU.

11. A non-transitory computer-readable storage medium that stores instructions for execution by processing circuitry of a station (STA), the STA included in a first plurality of STAs affiliated with a first multi-link logical entity (MLLE),
wherein as part of the first MLLE, each STA of the first plurality of STAs share a common medium access control (MAC) data service interface to an upper layer, wherein the common MAC data service interface is associated with a common MAC address,
wherein a plurality of links is established between the first MLLE and a second MLLE, wherein the second MLLE is affiliated with a second plurality of STAs, wherein one of the links of the plurality is established between each STA of the first plurality of STAs and one of the STAs of the second plurality of STAs,
the operations to configure the processing circuitry to:
encode, for transmission to a corresponding STA of the second plurality of STAs, an aggregated MAC protocol data unit (A-MPDU) that includes:
multiple MAC protocol data units (MPDUs), and
for each of the MPDUs included in the A-MPDU, a block acknowledgement (BA) index for a BA bitmap, wherein the BA index indicates a bit position within the BA bitmap to be used, by the corresponding STA of the second plurality of STAs, to acknowledge the MPDU,
wherein the multiple MPDUs of the A-MPDU are a subset of a sequence of MPDUs, wherein the sequence of MPDUs is to be transmitted by the first plurality of STAs to the second plurality of STAs in accordance with the first and second MLLEs, wherein the sequence of MPDUs is divided into multiple subsets, each subset to be transmitted by a different STA of the first plurality of STAs.

12. The apparatus according to claim 11, the operations to further configure the processing circuitry to:

assign the BA indexes to the MPDUs of the A-MPDU, wherein assignment of the BA indexes to the MPDUs is configurable to be independent of the corresponding SNs of the MPDUs.

13. The apparatus according to claim 11, the operations to further configure the processing circuitry to encode the A-MPDU to include, for each of the MPDUs included in the A-MPDU, a delimiter that includes the BA index of the MPDU.

14. The apparatus according to claim 11, the operations to further configure the processing circuitry to:
decode the BA bitmap, wherein the BA bitmap is received from the corresponding STA of the second plurality of STAs; and
determine whether each of the transmitted MPDUs was successfully received by the STA based on values of the BA bitmap in bit positions corresponding to the indexes indicated in the A-MPDU.

15. The apparatus according to claim 14, wherein the BA bitmap is included in a legacy BA variant, wherein one or more bits of the legacy BA variant are re-purposed to include one or more bits of the BA bitmap, or
the BA bitmap is included in a BA variant, wherein a plurality of bits of the BA variant are allocated for the BA bitmap.

16. The apparatus according to claim 11, the operations to further configure the processing circuitry to:
encode the A-MPDU to indicate a maximum number of BA indexes that can be supported by the BA bitmap.

17. An apparatus of a station (STA), the STA included in a first plurality of STAs affiliated with a first multi-link logical entity (MLLE),
wherein as part of the first MLLE, each STA of the first plurality of STAs share a common medium access control (MAC) data service interface to an upper layer, wherein the common MAC data service interface is associated with a common MAC address,
wherein a plurality of links is established between the first MLLE and a second MLLE, wherein the second MLLE is affiliated with a second plurality of STAs, wherein a link one of the links of the plurality is established between each STA of the first plurality of STAs and one of the STAs of the second plurality of STAs,
the apparatus comprising: memory; and processing circuitry, configured to:
for a plurality of fragments of a MAC protocol data unit (MPDU), encode one or more of the fragments for transmission on the link between the STA and the corresponding STA of the second plurality of STAs;
attempt to decode acknowledgement (ACK) indicators for the transmitted fragments;
if the processing circuitry determines, based on received ACK indicators, successful reception of at least one of the transmitted fragments, all of the fragments of the MPDU are to be transmitted exclusively by the STA without transmission of any of the fragments by any of the other STAs of the first plurality of STAs.

18. The apparatus according to claim 17, the processing circuitry further configured to:
if the processing circuitry determines, based on received ACK indicators, successful reception of at least one of the transmitted fragments, all of the fragments of the frame are to be transmitted exclusively by the STA without transmission of any of the fragments by any of the other STAs of the first plurality of STAs unless the processing circuitry determines that the first MLLE is to perform a flush operation for the MPDU, wherein as part of the flush operation, the entire MPDU is to be transmitted by another STA of the first plurality of STAs on another link, including fragments for which the STA has previously determined successful reception on the link between the STA and the corresponding STA of the second plurality of STAs.

19. The apparatus according to claim 17, the processing circuitry further configured to:
   if the processing circuitry decodes at least one ACK indicator that indicates successful reception of one of the fragments:
   if a switch to another link is to occur before the processing circuitry determines successful reception of all the fragments, refrain from switching to the other link until the processing circuitry determines successful reception of all of the fragments.

20. The apparatus according to claim 17, the processing circuitry further configured to:
   encode, for transmission to one or more of the other STAs of the first plurality of STAs, signaling that indicates parameters that are related to fragmentation, and that are to be used on all of the links of the plurality of links, wherein the parameters include one or more of:
   a dot11EDCATableMSDULifetime and timer,
   a dot11MaxTransmitLifetime and timer, and
   a dot11MaxReceiveLifetime and timer.

21. The apparatus according to claim 17, the processing circuitry further configured to:
   encode, for transmission to one or more of the STAs of the first plurality of STAs, signaling that indicates parameters related to fragmentation, and that are configurable for different values for different links, wherein the parameters are related to one or more of:
   support of a fragmentation level,
   a minimum fragment size,
   a capability of aggregated MAC service data unit (A-MSDU) fragmentation,
   a number of outstanding fragmented MPDUs or A-MSDUs permitted, and
   a dot11FragmentationThreshold parameter.

* * * * *

UNITED STATES PATENT AND TRADEMARK OFFICE
CERTIFICATE OF CORRECTION

PATENT NO. : 11,076,385 B2
APPLICATION NO. : 16/537028
DATED : July 27, 2021
INVENTOR(S) : Huang et al.

Page 1 of 1

It is certified that error appears in the above-identified patent and that said Letters Patent is hereby corrected as shown below:

In the Claims

In Column 38, Lines 40-41, in Claim 17, after "wherein", delete "a link"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*